(12) United States Patent
Murayama et al.

(10) Patent No.: US 8,271,444 B2
(45) Date of Patent: Sep. 18, 2012

(54) STORAGE CONTROL DEVICE TO BACKUP DATA STORED IN VIRTUAL VOLUME

(75) Inventors: Tomonori Murayama, Yokohama (JP); Yoichi Mizuno, Yokohama (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 0 days.

(21) Appl. No.: 12/926,770

(22) Filed: Dec. 8, 2010

(65) Prior Publication Data

US 2011/0082834 A1    Apr. 7, 2011

Related U.S. Application Data

(63) Continuation of application No. 12/003,904, filed on Jan. 3, 2008, now Pat. No. 7,873,600.

(30) Foreign Application Priority Data

Jan. 24, 2007   (JP) ................................. 2007-013384

(51) Int. Cl.
   *G06F 17/30* (2006.01)
(52) U.S. Cl. ........................................ 707/640; 707/655
(58) Field of Classification Search .................. 707/640, 707/655
   See application file for complete search history.

(56) References Cited

U.S. PATENT DOCUMENTS

| 5,210,866 | A | 5/1993 | Milligan et al. |
| 7,330,947 | B2 | 2/2008 | Hasegawa |
| 2002/0026558 | A1 | 2/2002 | Reuter et al. |
| 2005/0044310 | A1* | 2/2005 | Cameron ....................... 711/112 |
| 2005/0091455 | A1 | 4/2005 | Kano et al. |
| 2005/0108292 | A1* | 5/2005 | Burton et al. ................. 707/200 |
| 2007/0043787 | A1* | 2/2007 | Cannon et al. ................ 707/203 |

FOREIGN PATENT DOCUMENTS

| JP | 2003-015915 | 1/2003 |
| JP | 2005-018233 | 1/2005 |
| JP | 2005-107645 | 4/2005 |
| WO | WO 2005/017737 A2 | 2/2005 |

OTHER PUBLICATIONS

Office Action from the Japanese Patent Office dated Dec. 13, 2011 for the corresponding Japanese Patent Application No. 2007-013384 (3 pages).

* cited by examiner

*Primary Examiner* — John E Breene
*Assistant Examiner* — Dennis Myint
(74) *Attorney, Agent, or Firm* — Stites & Harbison, PLLC; Juan Carlos A. Marquez, Esq.

(57) ABSTRACT

A storage control device uses write management information that manages locations of the occurrence of writing in one or more first storage devices in order to specify one or more locations where writing has occurred, and backs up one or more data elements stored in one or more specified locations to a second storage device. In order to perform a restore operation, write management information at the time of a backup is stored, and data elements stored in the second storage device are restored to one or more locations specified from the write management information at that time of backup, or to one or more new locations specified from new write management information indicating one or more new locations corresponding to the one or more locations.

19 Claims, 20 Drawing Sheets

FIG. 4

| EXTERNAL DISK ID | SEGMENT NUMBER(SN) | LBA(START) | SIZE | IN-USE |
|---|---|---|---|---|
| 0 | 1 | 0 | 1000 | 1 |
|   | 2 | 1000 | 1000 | 1 |
|   | 3 | 2000 | 1000 | 1 |
|   | ... | ... | ... | ... |
| 1 | 10 | 0 | 1000 | 0 |
|   | 11 | 1000 | 1000 | 1 |
|   | ... | ... | ... | ... |
| ... | ... | ... | ... | ... |

FIG. 5

| LUN | CAPACITY | SEGMENT NUMBER(SN) | LUN LBA(START) | LUN LBA(END) |
|---|---|---|---|---|
| 0 | 2000GB | 1 | 0 | 999 |
|   |   | 2 | 1000 | 1999 |
|   |   | 3 | 2000 | 2999 |
| 1 | 100GB | 4 | 0 | 999 |
|   |   | ... | ... | ... |
| 2 | 300GB | 7 | 0 | 999 |
|   |   | ... | ... | ... |
| ... | ... | ... | ... | ... |

FIG. 6

| | 610 | 620 | 630 |
|---|---|---|---|
| 213 | EXTERNAL DISK ID | DEVICE ID | DISK ID |
| 611 | 0 | 621 — 1 | 631 — 100 |
| | 1 | 2 | 101 |
| | 2 | 3 | 102 |
| | ... | ... | ... |

FIG. 10

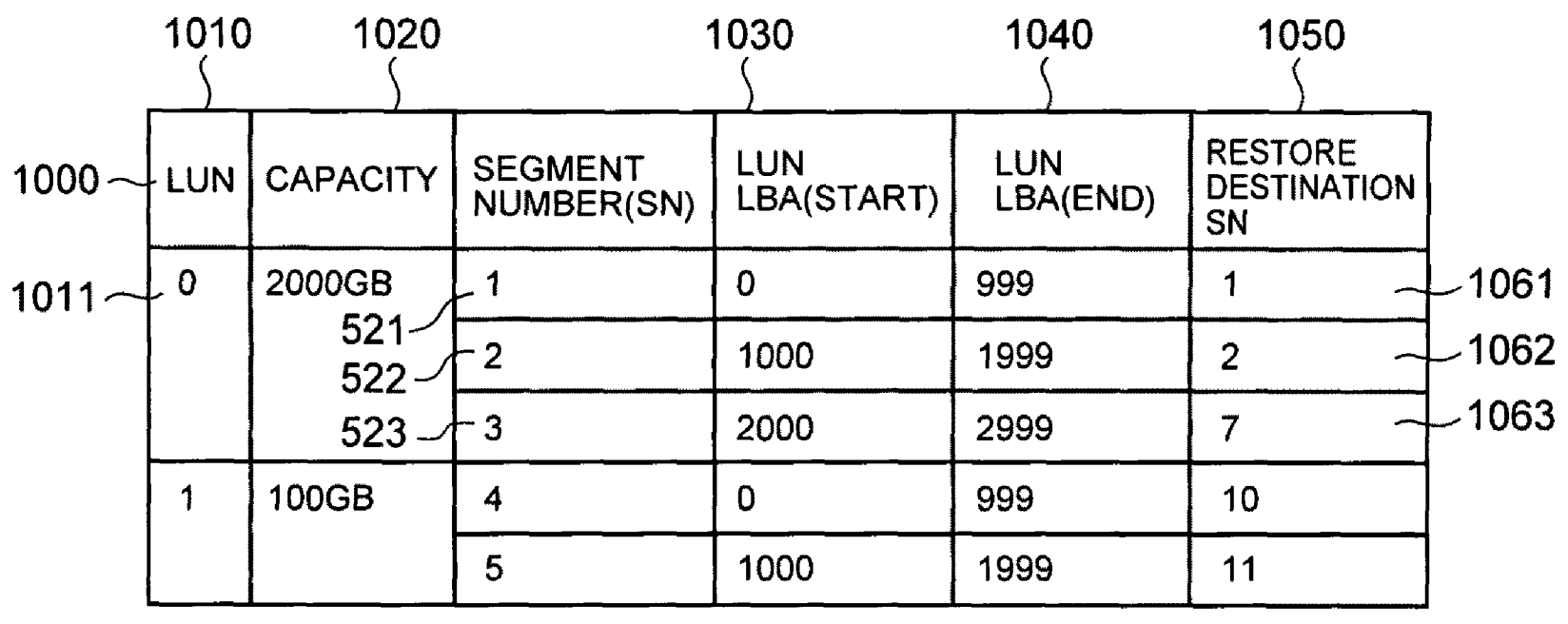

| LUN 1010 | CAPACITY 1020 | SEGMENT NUMBER(SN) | LUN LBA(START) 1030 | LUN LBA(END) 1040 | RESTORE DESTINATION SN 1050 |
|---|---|---|---|---|---|
| 0 | 2000GB | 1 | 0 | 999 | 1 |
| | | 2 | 1000 | 1999 | 2 |
| | | 3 | 2000 | 2999 | 7 |
| 1 | 100GB | 4 | 0 | 999 | 10 |
| | | 5 | 1000 | 1999 | 11 |

1310 — VIRTUAL VOLUME INFORMATION — 122
1320 — SEGMENT0
SEGMENT1
SEGMENT2
SEGMENT3
SEGMENT4
...

| DISK ID | DIFFERENTIAL BITMAP NUMBER | DIFFERENTIAL MANAGEMENT SIZE | DIFFERENTIAL BITMAP STORAGE POSITION |
|---|---|---|---|
| 100 | 1 | 1MB | 100:0-1000 |
| 101 | 2 | 1NB | 101:0-1000 |
| 102 | 3 | 1MB | 200:0-1000 |
| 103 | 4 | 2MB | 200:3000-4000 |
| 104 | 5 | 2MB | 201:1000-2000 |
| ... | ... | ... | ... |

1410, 1420, 1430, 1440, 1400, 1441

1510a 1510b 1510c 1510d 1510e

| 1001 | 1002 | 1003 | 1004 | 1005 | ... | | | |
| 2001 | ... | | | | | | | |
| ... | | | | | | | | |

| 2000 | DISK ID (2010) | SEGMENT NUMBER(SN) (420) | LBA(START) (430) | SIZE (440) | IN-USE (450) |
|---|---|---|---|---|---|
| 411 | 0 | 1 | 431— 1 | 441— 1000 | 1 |
| | | 2 | 432— 1000 | 442— 1000 | 1 |
| | | 3 | 433— 2000 | 443— 1000 | 1 |
| | | ... | ... | ... | ... |
| | 1 | 10 | 0 | 1000 | 0 |
| | | 11 | 1000 | 1000 | 1 |
| | | ... | ... | ... | ... |
| | ... | ... | ... | ... | ... |

FIG. 21

| 2100 | LUG (510) | CAPACITY (520) | SEGMENT NUMBER(SN) (530) | LUG LBA(START) (540) | LUG LBA(END) (550) |
|---|---|---|---|---|---|
| 511 | 0 | 2000GB | 521— 1 | 0 | 999 |
| | | | 522— 2 | 1000 | 1999 |
| | | | 523— 3 | 2000 | 2999 |
| | 1 | 100GB | 4 | 0 | 999 |
| | | | ... | ... | ... |
| | 2 | 300GB | 7 | 0 | 999 |
| | | | ... | ... | ... |
| | ... | ... | ... | ... | ... |

STORAGE CONTROL DEVICE TO BACKUP DATA STORED IN VIRTUAL VOLUME

CROSS-REFERENCE TO PRIOR APPLICATION

This application is a Continuation application of U.S. application Ser. No. 12/003,90,4 filed Jan. 3, 2008 now U.S. Pat. No. 7,873,600. Priority is claimed based on U.S. application Ser. No. 12/003,904 filed Jan. 3, 2008, which claims priority to Japanese Patent Application No. 2007-13384, filed on Jan. 24, 2007, the entire disclosures of which are incorporated herein by reference.

BACKGROUND

The present invention relates to technology for data backup.

Storage systems can provide storage areas to host computers, in units called virtual volumes. In general, the storage capacity of a virtual volume is fixed; but there exists technology to automatically expand the storage capacity of a virtual volume, by allocating to the virtual volume a partial area of a physical resource (hereafter called a "segment"), in response to an access request from a host computer, in order to increase the efficiency of storage area utilization. For example, a disclosure of Japanese Patent Laid-open No. 2003-15915 is related to such technology.

A virtual volume is a virtual logical volume. A storage system can show to a host computer (specifically, for example, to an application executed by the host computer) a virtual storage capacity (hereafter called a "virtual capacity") different from the total storage capacity of one or more segments actually allocated to the virtual volume (hereafter called the "actual capacity"). By allocating a segment to a virtual volume, the actual capacity of the virtual volume increases by (is expanded by) the storage capacity of the segment. Consequently, a virtual volume can also be called a "capacity expansion volume". Or, because a virtual volume is a logical volume which can be provided using "thin provisioning" technology, a virtual volume can also be called a "thin provisioning volume".

For example, a method exists in which a host computer is connected to disk storage and a tape library apparatus by a communication network called a Storage Area Network (SAN), and data stored in the disk storage is backed up in volume units to the tape library apparatus by a server for backup processing (hereafter called a "backup server"). In this case, the backup server reads data from logical volumes of the disk storage, and stores the read-out data to the tape library apparatus.

When a logical volume for backup is a virtual volume as described above, the virtual volume appears to the backup server to be a virtual volume with a virtual capacity amount different from the actual capacity, and so at the time of backup, reading and writing of the virtual capacity amount is performed. In general, the actual capacity is smaller than the virtual capacity. For this reason, reading and writing of the virtual capacity amount includes unnecessary reading and writing.

Further, when for example backed-up data is restored, in a process opposite that of the backup process, and more specifically, when data is restored to a logical volume within the disk storage from the tape library apparatus via the backup server, writing occurs to the virtual volume which is the restore destination in the virtual capacity amount, and so a larger actual capacity is required than at the time of backup.

The above problems can similarly occur when the backup source is a storage device of a type different from the disk storage, and/or when the backup destination is a storage device of a type different from the tape library apparatus.

SUMMARY

Hence an object of this invention is to prevent the occurrence of unnecessary reading and writing in the backup of a virtual volume.

Another object of the invention is to prevent the need for a larger actual capacity during restoring of a virtual volume than at the time of backup.

Other objects of the invention will become clear from the following explanation.

In a backup operation, a storage control device references write management information, which is information to manage the location of occurrence of writing in one or more first storage devices related to a plurality of segments, in order to specify one or more locations of the occurrence of writing in the one or more first storage devices, and backs up the one or more data elements stored in the specified one or more locations to a second storage device.

In order to perform a restore operation, the storage control device stores write management information at the time of a backup. In a restore operation, the storage control device acquires the write management information stored at the time of the backup, and restores, to one or more locations specified from the write management information, or to one or more new locations specified from new write management information representing one or more new locations corresponding to the one or more locations, one or more data elements stored in one or more locations among the plurality of data elements stored in the second storage device.

BRIEF DESCRIPTION OF THE DRAWINGS

FIG. 4 shows an example of the configuration of a segment management table;

FIG. 5 shows an example of the configuration of a physical/logical management table;

FIG. 6 shows an example of the configuration of an external disk correspondence table;

FIG. 10 shows an example of the configuration of a physical/logical management table with restore destination information appended;

FIG. 20 shows an example of the configuration of a segment management table in the third embodiment of the invention;

FIG. 21 shows an example of the configuration of a physical/logical management table in the third embodiment of the invention;

DESCRIPTION OF THE PREFERRED EMBODIMENTS

Figure 1:
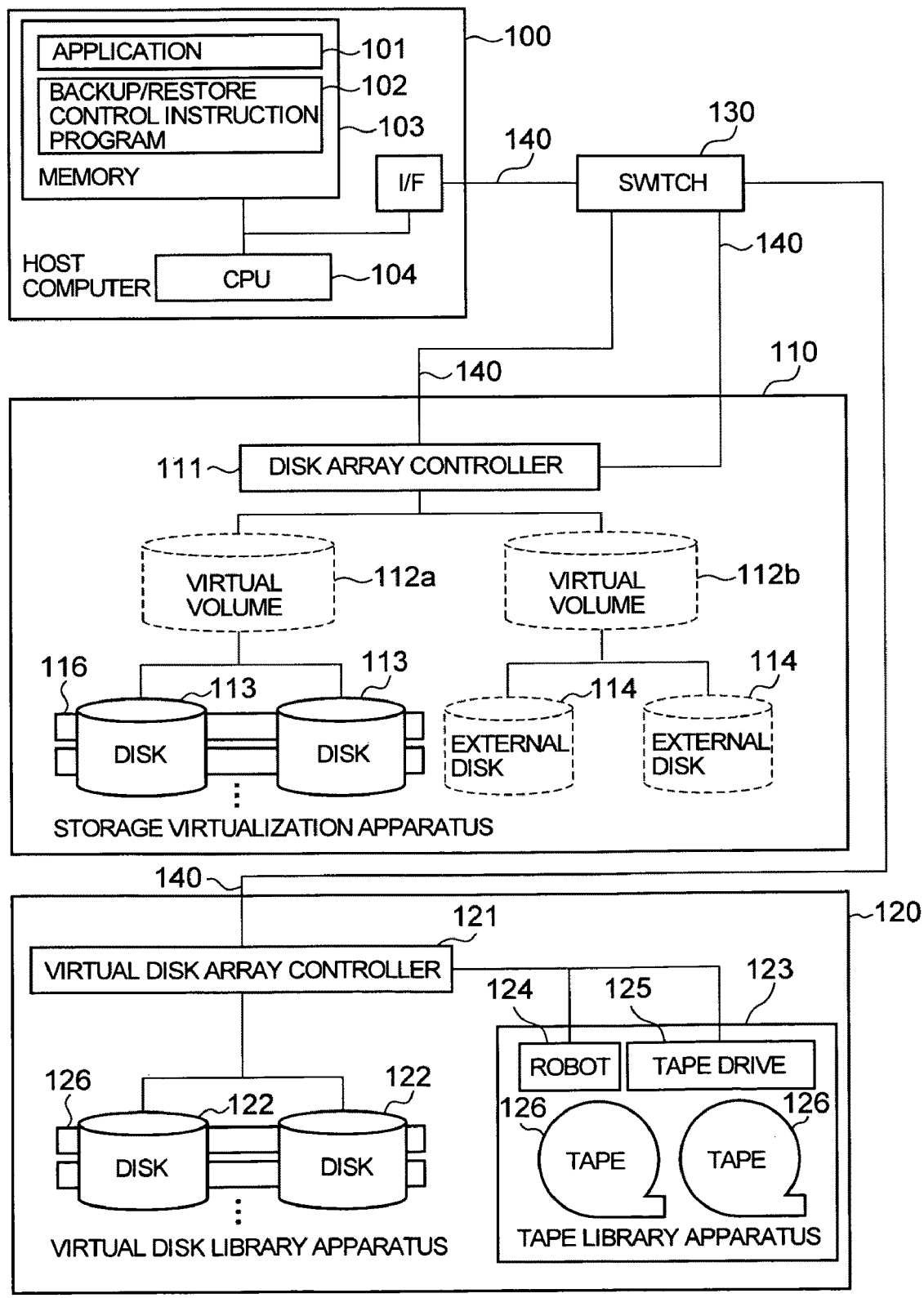
FIG. 1 shows an example of the configuration of a computer system in one embodiment of the invention.

Embodiments of the invention are explained in summary below.

A storage control device is comprised by a virtualization system, which allocates unallocated segments, among a plurality of segments, according to a write operation to a virtual volume which is a virtual logical volume provided to a higher-level device, and writes data elements to the allocated segments according to the write operation. This storage control device may for example be a virtual disk library apparatus, described below, but is not limited thereto, and other types of device may be provided instead.

The storage control device comprises one or more first storage devices related to a plurality of segments, a second storage device, and a backup control portion. The backup control portion uses write management information, which is information used to manage the locations of write operations in the one or more first storage devices, to identify one or more locations in which writing has occurred in one or more first storage devices, and backs up one or more data elements stored in the identified one or more locations to the second storage device.

Here, "one or more first storage devices related to a plurality of segments" is one or more first storage devices, comprising segments or storage areas corresponding to segments. In this case, when writing of a data element to a certain segment occurs, writing of the data element to the certain segment itself or to a storage area corresponding to the certain segment occurs. A specific example of one or more first storage devices, in the cases of the first through fourth embodiments described below, may be disks within a virtual disk library apparatus.

As each of the one or more first storage devices, a random access-type storage device can be adopted. Such a storage device may for example be a hard disk drive, DVD drive, or other disk-type storage device, or may be flash memory or some similar memory device. As the second storage device, a sequential access-type storage device can be adopted. Such a storage device may for example be a device which uses tape media. However, these devices are not limited to such examples, and for example a sequential access-type storage device may be used as a first storage device, and a random access-type storage device may be used as a second storage device.

A storage control device can further comprise a storage portion and a restore control portion. The storage portion can store the write management information at the time of a backup. The restore control portion can read the write management information stored at the time of a backup, and can restore one or more data elements stored in the second storage device to one or more locations identified from the read-out write management information, or to one or more new locations identified from new write management information representing one or more new locations corresponding to the above one or more Locations. The new write management information is information which has been generated based on read-out write management information.

The storage portion may store the write management information for a backup in the second storage device, or may store the information in another storage device (for example, in memory within the storage control device).

A storage control device can be connected to a virtualization apparatus. This virtualization apparatus can comprise storage resources, a write control portion, and a write management information transmission portion. Storage resources can store allocation management information, which is information representing which segment, among the plurality of segments comprised by one or more virtual first storage devices, has been allocated to the virtual volume based on one or more first storage devices, and correspondence management information, representing the correspondence between each of the plurality of segments and physical areas in the one or more first storage devices. The write control portion can receive a first write request for write data to be written to the virtual volume from a higher-level device; in response to the first write request, select one or more unallocated segments from among the plurality of segments based on the allocation management information; allocate the selected unallocated one or more segments to the virtual volume; update the allocation management information with information indicating that one or more segments have been allocated to the virtual volume; use the correspondence management information to update the one or more physical areas corresponding to the allocated one or more segments; and transmit to the storage control device a second write request, for writing of the write data to the identified one or more physical areas. The write management information transmission portion can transmit the write management information, comprising allocation management information and correspondence management information, to the storage control device.

A virtualization apparatus may further comprise a segment reallocation portion. The restore control portion can read out write management information for a backup, and can transmit the read-out write management information to the virtualization apparatus. The segment reallocation portion of the virtualization apparatus can associate one or more new segments with one or more segments identified by the storage control device from the write management information, generate new write management information representing the one or more new physical areas corresponding to the one or more new segments based on the write management information, and transmit the generated new write management information to the storage control device. The restore control portion of the storage control device can restore, to the one or more new physical areas identified by the virtualization apparatus from the new write management information, one or more data elements stored in the second storage device.

The virtualization apparatus need not comprise a write management information transmission portion. Further, the restore control portion of the storage control device need not comprise a function to transmit write management information to the virtualization apparatus. In this case, for example, the storage control device can comprise a write execution portion. The write execution portion can write the write data according to a second write request from the virtualization apparatus to one or more physical areas in one or more first storage devices according to the second write request, and can update the write management information with information indicating the occurrence of writing to the one or more physical areas. The backup control portion can use the updated write management information to identify one or more physical areas in the one or more first storage devices in which writing has occurred, and can back up the one or more data elements stored in the identified one or more physical areas to the second storage device. The virtualization apparatus may further comprise an allocation management information storage portion, which stores allocation management information at the time of a backup. The restore control portion can restore one or more data elements stored in the second storage device to one or more physical areas identified from the write management information for a backup, and the allocation management information storage portion can restore the allocation management information at the time of backup of one or more restored data elements to the storage resources. The allocation management information storage portion may store allocation management information for a backup in at least one among the one or more storage devices, or may store the information in another storage device (for example, memory in the virtualization apparatus, or memory in the storage control device).

In a case in which a plurality of elements, in the amount of the virtual capacity amount, are backed up to the second storage device, the restore control portion may identify, from among the plurality of data elements stored in the second storage device, one or more data elements stored in the one or more locations identified from the write control information for the time of backup, and may restore only the one or more identified data elements to the one or more first storage devices.

Each of the portions described above can be constructed by means of hardware, a computer program, or a combination thereof (for example, with a portion realized by a computer program, and the remainder realized in hardware). A computer program is read and executed by a prescribed processor. In the event of information processing performed when a computer program is read by a processor, storage space existing in memory and other hardware resources may be used as appropriate. A computer program may also be installed onto a computer from a CD-ROM or other recording media, or may be downloaded to a computer over a communication network.

Below, a number of embodiments of the invention are explained in detail, referring to the drawings. In the following explanation, the data stored in one segment, or in the physical area corresponding to the segment, is called a "data element".

<First Embodiment>

FIG. 1 shows an example of the configuration of a computer system in a first embodiment of the invention.

The host computer 100, storage virtualization apparatus 110, and virtual disk library apparatus 120 are connected using fiber channel 140 via a switch 130, and exchange data, processing requests and similar. The host computer 100 storage virtualization apparatus 110 and virtual disk library apparatus 120 may be connected via a LAN (Local Area Network) or other communication network, or may be connected via dedicated circuits or similar.

The host computer 100 comprises a CPU 104 and memory 103. In the memory 103 are stored, as a plurality of computer programs, for example, an application 101 and a backup/restore control instruction program 102. These computer programs are executed by the CPU 104. Below, when a computer program is the subject of a sentence, processing is in actuality performed by the CPU which executes the program. The application 101 writes data to a logical volume (for example, a virtual volume) provided by the storage virtualization apparatus 110, and reads data from the logical volume. The backup/restore control instruction program 102 issues various commands, such as backup initiation instructions and restore initiation instructions.

The storage virtualization apparatus 110 comprises a disk array controller 111; one or more (for example, two) virtual volumes 112; one or more (for example, two) disks 113; one or more (for example, two) disk devices 116; and one or more (for example, two) external disks 114. The disk devices 116 may be disk-type storage devices, such as hard disk drives, DVD drives or similar, but may some other type of storage device (such as a flash memory device) as well. The disks 113 are logical volumes, formed based on storage space of at least one disk device 116 among the one or more disk devices 116. The external disks 114 are virtual logical volumes, formed based on storage space of at least one disk device 126 (at least one disk device 126 in a virtual disk library apparatus 120) external to the storage virtualization apparatus 110. The external disks 114 may be provided by employing for example the technology disclosed in Japanese Patent Laid-open No. 2005-107645 (U.S. patent application Ser. No. 10/769805, U.S. patent application Ser. No. 11/471556), or may be associated one-to-one with an external disk (logical volume) 122. Segments of one or more disks 113 are allocated to a virtual volume 112a. Segments of one or more external disks 114 are allocated to a virtual volume 112b. Data written to segments of an external disk 114 correspond to these segments. Writing is to the physical area comprised by the disks 122.

The virtual disk drive library apparatus 120 comprises a virtual disk array controller 121, one or more disks 122, one or more disk devices 126, and a tape library apparatus 123. The disk devices 126 are disk-type storage devices; but another type of storage device (such as a flash memory device) may be used. The tape library apparatus 123 comprises one or more tapes 126, a robot 124 which moves tapes 126, and a tape drive 125 which writes data to and reads data from tapes 126.

Figure 2:
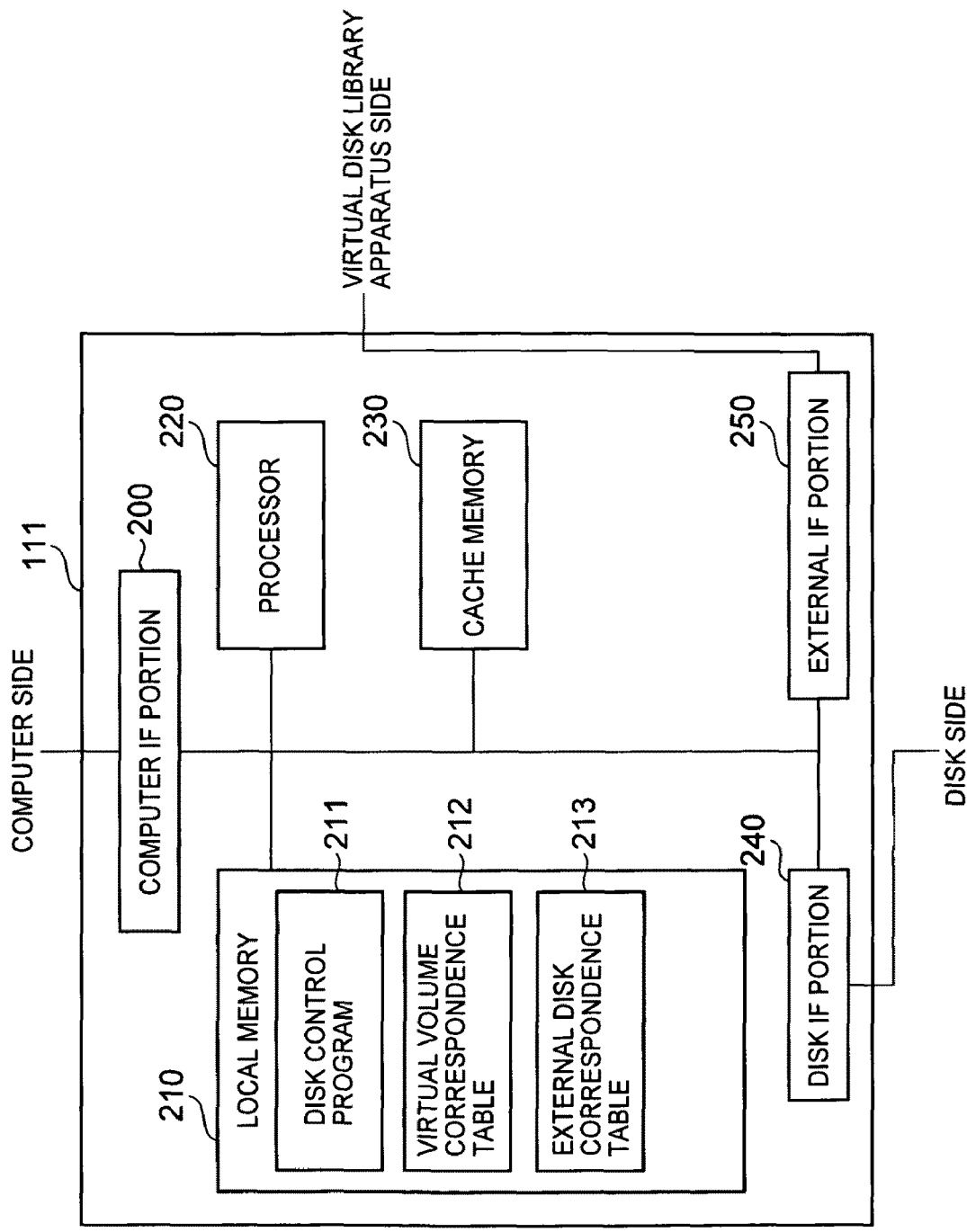
FIG. 2 shows an example of the configuration of a disk array controller of a storage virtualization apparatus.

FIG. 2 shows an example of the configuration of a disk array controller 111.

The disk array controller 111 comprises a computer IF portion 200, which is the interface with the host computer 100; a disk control program 211; local memory (hereafter called control memory) 210, which stores a virtual volume correspondence table 212 and external disk correspondence table 213; a processor (for example, a CPU; hereafter called a control processor) 220, which executes the disk control program 211; cache memory 230, which temporarily stores data; a disk IF portion 240, which is the interface with disks 113; and, an external IF portion 250, which is the interface with the virtual disk library apparatus 120.

The disk control program 211 has functions to show virtual volumes 112a and 112b to the host (for example, the application 101) using the virtual volume correspondence table 212. Further, the disk control program 211 has functions to use the external disk correspondence table 213 to handle a disk 122 of the virtual disk library apparatus 120, externally connected to the storage virtualization apparatus 110, as an external disk 114. Unused segments among the plurality of segments comprised by the disk 113 are allocated to a plurality of address ranges of the virtual volume 112*a* in accordance with the access (for example, by writing) to the address ranges. Hence each of the actual areas of the virtual volume 112*a* can be regarded as a segment on the disk 113 allocated to this virtual volume 112*a*. On the other hand, unused segments among the plurality of segments comprised by the external disk 114 are allocated to each of a plurality of address ranges of the virtual volume 112*b*, according to accessing of (for example, writing to) the address ranges. The allocated segments correspond to the plurality of physical areas (storage areas) comprised by the disk 112. Hence each of the actual areas of the virtual volume 112*b* may be a segment of the external disk 114 allocated to this virtual volume 112*b*, or may be a physical area in the disk 122 corresponding to a segment. As the storage capacities of the virtual volumes 112*a* and 112*b*, virtual capacities (storage capacities equal to or greater than the actual capacities) different from the actual capacities (the total storage capacity of the one or more allocated segments) are provided to the host. The disk control program 211 further has functions for managing the disks 113 and external disks 114 of the storage virtualization apparatus 110.

Figure 3:
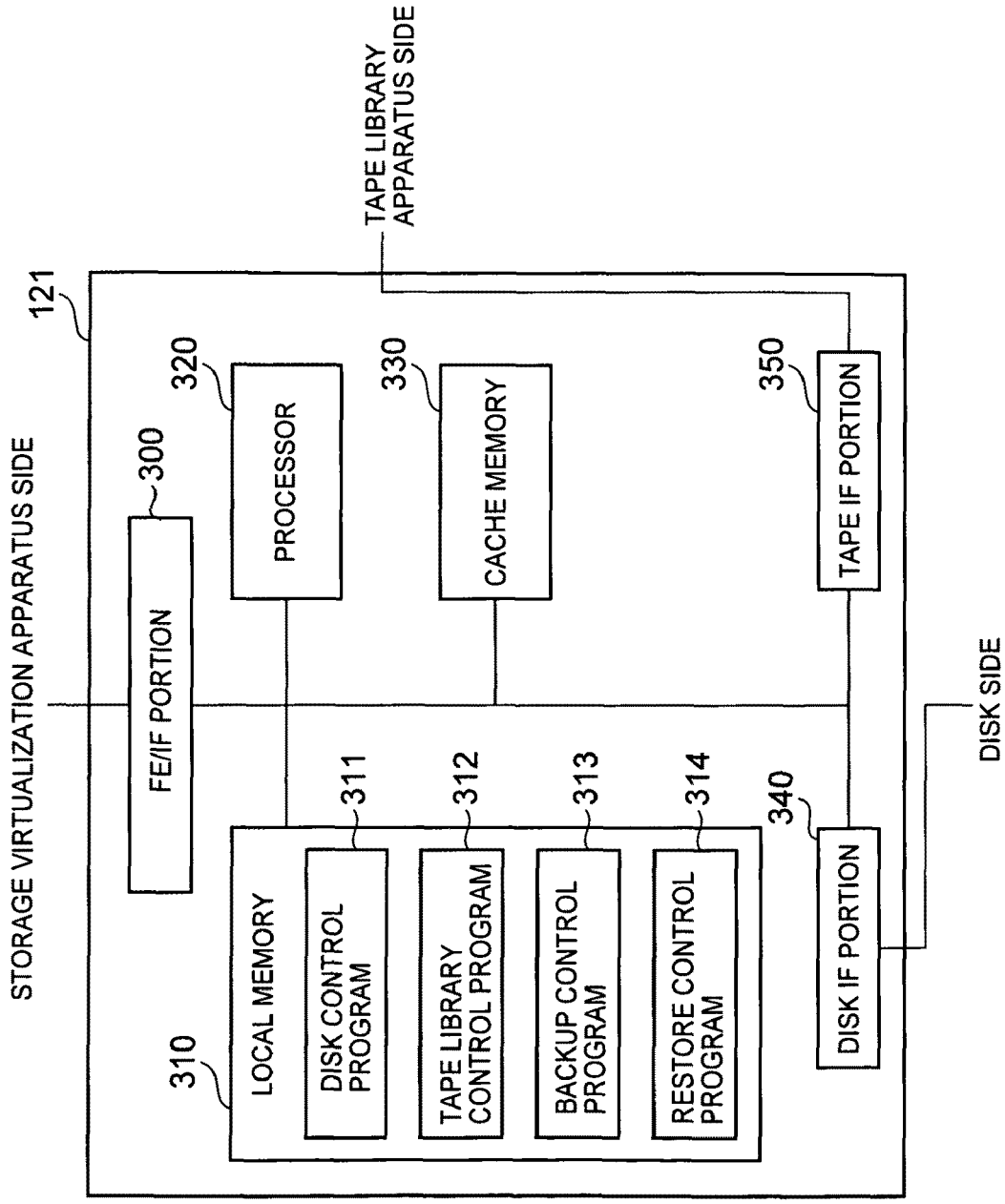
FIG. 3 shows an example of the configuration of the virtual disk array controller of a virtual disk library apparatus.

FIG. 3 shows an example of the configuration of a virtual disk array controller 121.

The virtual disk array controller 121 comprises an FE/IF portion 300, which is the interface to the storage virtualization apparatus 110; a disk control program 311; a tape library control program 312; local memory (hereafter called control memory) 310, which stores a backup control program 313 and restore control program 314; a processor (for example, a CPU; hereafter called a control processor) 320, which executes the disk control program 311, the tape library control program 312, backup control program 313, and restore control program 314; cache memory 330, which temporarily stores data; disk IF portion 340, which is the interface with disks 122; and tape IF 350, which is the interface with the tape library apparatus 123.

The disk control program 311 has functions to manage and control disks 122 of the virtual disk library apparatus 120. Specifically, for example, upon receiving a first write request for the virtual volume 112*b* from the host computer 100, the disk control program 211 of the storage virtualization apparatus 110 identifies an unallocated segment in the external disk 114 from the segment management table 400, identifies the disk 122 with the physical area corresponding to the identified segment from the external disk correspondence table 213, and transfers to the virtual disk library apparatus 120 a second write request, specifying the identified disk 122 and the address corresponding to the identified segment (the physical area address). In response to this second write request, the disk control program 311 writes the data element of the data according to the second write request to the physical area corresponding to the address specified by the second write request.

The tape library control program 312 has functions for managing and controlling the tape library apparatus 123 of the virtual disk library 120. Specifically, upon backup processing and restore processing of the virtual volumes 112*a* and 112*b*, for example, the backup control program 313 and restore control program 314 are executed; but in this backup processing and restore processing, data writing to the tape 126, and data reading from the tape 126, are performed by appropriately calling and executing the tape library control program 312 from the backup control program 313 or restore control program 314. Below, backup processing is explained referring to FIG. 7, and restore processing is explained referring to FIG. 8 and FIG. 9; but in order to avoid a prolix explanation, here an explanation relating to calling of the tape library control program 312 is omitted.

The backup control program 313 has a function (hereafter called a backup function) to act in cooperation with the disk control program 311 and tape library control program 312 to copy data on the disk 122 to the tape 126. The backup control program 313 further has a function to communicate with the storage virtualization apparatus 110, and to perform a backup while referencing the virtual volume correspondence table 212 and external disk correspondence table 213, so that only the actual areas of the virtual volume 112*b*. The backup control program 313 further has a function to communicate with the storage virtualization apparatus 110, and to copy a portion of or all of the virtual volume correspondence table 212 and external disk correspondence table 213 to tape 126.

The restore control program 314 has a function (hereafter called a restore function) to act in cooperation with the disk control program 311 and tape library control program 312, to copy data on the tape 126 to the disk 122. Further, the restore control program 314 has a function for communicating with the storage virtualization apparatus 110 and transmitting the virtual volume correspondence table 212 and external disk correspondence table 213, stored on the table 126, to the disk control program 211. The disk control program 211 has a function to reference the virtual volume correspondence table 212 and external disk correspondence table 213 received from the restore control program 314, and create a virtual volume 112*b* to serve as the restore destination. The disk control program 211 has a function to transmit the virtual volume correspondence table 212 and external disk correspondence table 213, which serve as restore destination information, to the restore control program 314. The restore control program 314 has a function to perform a restore operation while referencing the virtual volume correspondence table 212 and external disk correspondence table 213 received from the disk control program 211.

The above-described virtual volume correspondence table 212 can comprise the segment management table 400 of FIG. 4 and the physical/logical management table 500 of FIG. 5.

FIG. 4 shows an example of the configuration of a segment management table 400.

A segment management table 400 is used to manage segments allocated as actual areas to the virtual volumes 112*a*, 112*b*. Segment management tables 400 include a segment management table for disks 113, and a segment management table for external disks 114. FIG. 4 shows a representative example of a segment management table for external disks 114 (a segment management table for disks 113 is omitted).

In a segment management table 400 for an external disk 114 are stored, for each external disk 114, the external disk ID 410, Segment Number (hereafter either "SN" or "segment number") 420, LBA (START) 430, Size 440, and In-use 450. The external disk ID 410 is a unique identification number for an external disk 114 (for example, a number determined by the disk control program 211). A segment is the minimum unit of storage area into which each disk 113 and external disk 114 is divided to be managed by the disk control program 211, and the SN 420 is a unique identification number used to manage segments in the disk control program 211. The LBA (START) 430 stipulates the physical position from which the segment starts within an external disk 114 with an external disk ID 410. Size 440 indicates the size of the storage area starting from LBA (START) 430 within the external disk 114. In-use 450 indicates the state of use of the segment, employing two values to indicate whether the segment is or is not being used by the disk control program 211. When the segment is being used, a value of 1 is stored, and when not in use a value of 0 is stored, to indicate the state of use.

FIG. 5 shows an example of the configuration of physical/logical management table 500.

A physical/logical management table 500 is used for physical/logical address management between a virtual volume 112 provided by the disk control program 211 and the disk 113 or external disk 114 in which data is stored. The physical/logical management table 500 stores, for each virtual volume 112, the LUN 510, capacity 520, SN 530, LUN LBA (START) 540, and LUN LBA (END) 550. The LUN 510 is the logical unit number, and is a unique number for a logical volume provided to the host computer 100 by the disk control program 211. The virtual volume 112 is provided to the host computer 100 as a logical volume. The capacity 520 is the capacity of the virtual logical volume (virtual capacity) provided to the host computer 100. The SN 530 is a unique number for a storage area managed by the disk control program 211. The LUN LBA (START) 540 indicates the LBA starting position in the address range which is the segment allocation destination (virtual volume address range). The LUN LBA (END) 550 indicates the LBA ending position in the address range which is the segment allocation destination (virtual volume address range).

The disk control program 211 monitors LBAs within individual I/O requests for logical volume access from the host computer 100, and when necessary performs processing to increase or decrease the actual area of the logical volume. Specifically, within for example a virtual volume LUN0 (510), when there is a write request specifying an address in the address range 0 to 999, for example, a segment SN1 (420) is allocated to the address range 0 to 999. In this case, SN1 is stored in the physical/logical management table 500 as the SN (530), and the In-use (450) value corresponding to SN1 (420) is set to 1. On the other hand, in for example virtual volume LUN0 (510), when a segment SN1 (530) is released from the address range 0 to 999, SN1 (420) is deleted from the physical/logical management table 500, and the In-use (450) value corresponding to SN1 (420) is set to 0.

FIG. 6 shows an example of the configuration of an external disk correspondence table 213.

An external disk correspondence table 213 is provided to manage the correspondence between external disks 114 and disks of other devices (for example, disks 122). In an external disk correspondence table 213 are stored, for each external disk 114, the external disk ID 610, device ID 620, and disk ID 630. The external disk ID 610 is a unique identification number for the external disk 114, determined by the disk control program 211. The device ID 620 is a unique identification number for the device externally connected to the storage virtualization apparatus 110 (for example, a virtual disk library apparatus 120). The disk ID 630 is a unique identifying number for a disk within the device identified by the device ID 620. For example, an external disk 114 with an external disk ID 0 (611) corresponds to a disk (for example, a disk 122) with disk ID 100 (631) of a device ID 1 (621). In FIG. 6, the external disks and disks are in a one-to-one correspondence; but a single external disk may correspond to a plurality of disks, or a plurality of external disks may correspond to a single disk.

Figure 7:
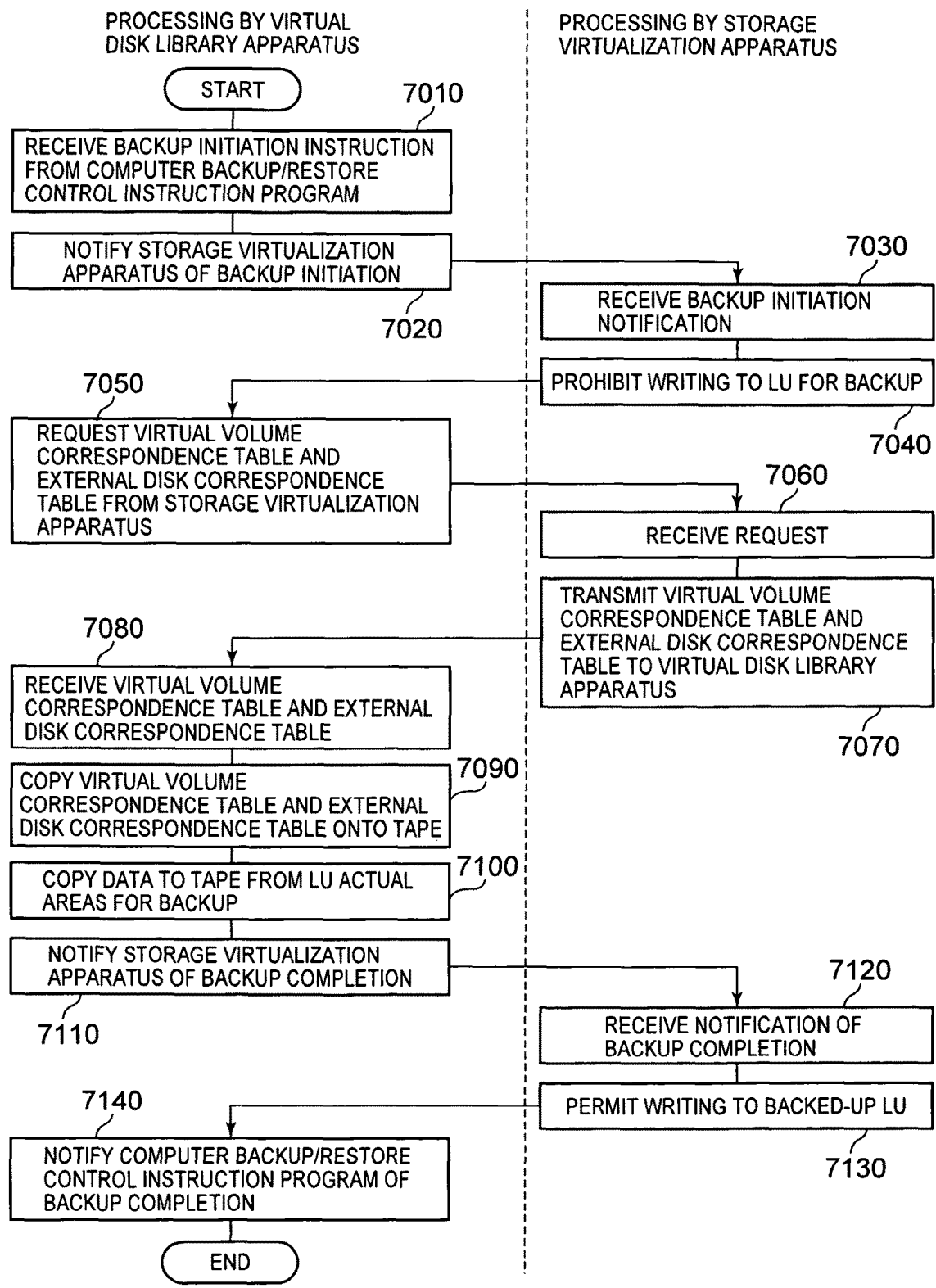
FIG. 7 shows an example of the processing flow for backup processing in a first embodiment of the invention.

FIG. 7 shows the processing flow of backup processing.

In step 7010, the backup/restore control instruction program 102 of the host computer 100 transmits a backup initiation instruction for a LU to be backed up to the virtual disk library apparatus 120, and the virtual disk library apparatus 120 receives this backup initiation instruction. For example, in the backup initiation instruction, the LUN of a virtual volume 112a or 112b which is to be backed up (the backup source), and a tape 126 which is the backup destination, are specified. The tape 126 which is the backup destination need not be specified; in this case, the correspondence relation between an arbitrarily selected table 126 (an unused tape 126 not yet used as a backup destination for data) and the LUN which is the backup source may be managed by storing in a table, not shown, or by other means. Moreover, a plurality of virtual volumes 112a or 112b may be specified together for backup. In this processing flow, the virtual volume 112b may be the LU for back up. Or, in place of a tape 126, the LUN of a tape LU may be specified. A tape LU is a logical unit corresponding to all of or a portion of the storage space of one or more tapes 126.

In step 7020, in response to the above backup initiation instruction, the backup control program 313 of the virtual disk library apparatus 120 notifies the storage virtualization apparatus 110 of the initiation of backup of the LU for backup 112b (virtual volume 112b).

In step 7030, the storage virtualization apparatus 110 receives the backup initiation notification for the LU for backup 112b.

In step 7040, in response to the backup initiation notification, the disk control program 211 of the storage virtualization apparatus 110 prohibits writing to the LU for backup 112b from a higher-level device (for example, from the host computer 100). Specifically, for example, even when a write request for the LU for backup 112b is received from the host computer 100, the disk control program 211 returns a busy response to the write request or does not respond at all, so that data is not written to the LU for backup 112b according to the write request. The disk control program 211 can notify the virtual disk library apparatus 120 of the write-prohibited state of the LU for backup 112b.

In step 7050, for example in response to the notification of the write-prohibited state from the storage virtualization apparatus 110, the backup control program 313 of the virtual disk library apparatus 120 is executed. In step 7050, the backup control program 313 requests the virtual volume correspondence table 212 and external disk correspondence table 213 relating to the LU for backup 112b from the storage virtualization apparatus 110. A request may be issued for all of the virtual volume correspondence tables 212 and external disk correspondence tables 213.

In step 7060, the storage virtualization apparatus 110 receives the request from the virtual disk library apparatus 120.

In step 7070, in response to this request, the disk control program 211 of the storage virtualization apparatus 110 transmits to the virtual disk library apparatus 120 the virtual volume correspondence table 212 and external disk correspondence table 213 requested by the virtual disk library apparatus 120.

In step 7080, the virtual disk library apparatus 120 receives the virtual volume correspondence table 212 and external disk correspondence table 213 transmitted from the storage virtualization apparatus 110.

In step 7090, the backup control program 313 of the virtual disk library apparatus 120 copies, to the tape 126 serving as the backup destination (the tape 126 specified by the backup initiation instruction), the virtual volume correspondence table 212 and external disk correspondence table 213 (the virtual volume correspondence table 212 and external disk correspondence table 213 transmitted from the storage virtualization apparatus 110) which are necessary when restoring the LU for backup 112b. The virtual volume correspondence table 212 and external disk correspondence table 213 are for example written from the beginning of the tape 126 serving as the backup destination. In place of writing from the beginning, writing may be at a prescribed position or at an arbitrary position on the tape 126 serving as the backup destination, or may be in a prescribed storage area within the tape library apparatus 123. The locations of writing of virtual volume correspondence tables 212 and external disk correspondence tables 213 corresponding to different LUs for backup are stored in a table, not shown, and when restoring a LU for backup, this table is referenced to identify the locations in which the virtual volume correspondence table 212 and external disk correspondence table 213 corresponding to the LU for backup are stored, so that the virtual volume correspondence table 212 and external disk correspondence table 213 may be read from the identified positions.

In step 7100, the backup control program 313 references the virtual volume correspondence table 212 and external disk correspondence table 213, identifies each of the physical areas comprised by the disk 122 equivalent to each of the actual areas of the LU for backup 112b, and copies each of the data elements stored in these physical areas from the physical areas to the tape 126 which is the backup destination. For example, in the case in which the LU for backup 112b is the LU LUN0 of FIG. 5, the physical areas corresponding to segment number 1 (521), segment number 2 (522), and segment number 3 (523) are backup sources. From FIG. 4 and FIG. 6, the segment corresponding to segment number 1 (521) of size 1000 (441) starting from LBA (START) 0 (431) within the disk 122 with disk ID 100 (631) in the device with ID 1 (621); this physical area is the actual area. Similarly, segment number 2 (522) is a physical area of size 1000 (442) starting from LBA (START) 1000 (432) within a disk 122 with disk ID 100 (631) of device ID 1 (621), and segment number 3 (523) is a physical area of size 1000 (443) starting from LBA (START) 2000 (433) within a disk 122 with disk ID 100 (631) of device ID 1 (621). In the backup of LU LUN0, copying of data elements is performed with these physical areas as the backup source and a tape 126 as the backup destination. As the order of copying, the order of the segment numbers (for example, for LUN0, in the order segment 1, 2, 3) stored in the physical/logical management table 500 (see FIG. 5) can be used. In place of this, copying may be performed in any other regular order, or copying may be in no regular order. When copying in no regular order, management may be performed by for example storing in a table, not shown, to which positions on the tape 126 which is the backup destination the data elements of physical areas corresponding to which segment numbers have been copied.

In step 7110, after completion of backup of the LU for backup 112b, the backup control program 313 notifies the storage virtualization apparatus 110 of the completion of backup of the LU for backup 112b.

In step 7120, the storage virtualization apparatus 110 receives notification of the completion of backup of the LU for backup 112b.

In step 7130, the disk control program 211 of the storage virtualization apparatus 110 permits writing to the LU for backup 112b (in other words, cancels the write prohibition state).

In step 7140, the virtual disk library apparatus 120 notifies the backup/restore control instruction program 102 of the host computer 100 of the completion of backup of the LU for backup 112b.

Through the above flow of processing, backup processing is performed. In this backup processing, when for example an unused area remains on the tape 126 which is the backup destination, in the next and subsequent backup processing, the virtual volume correspondence table 212 or similar may be stored from the beginning of this unused area, or, a completely unused tape 126 (a tape 126 on which data can be written from the tape beginning) may be selected, and the virtual volume correspondence table 212 and similar stored onto this tape 126.

Figure 8:
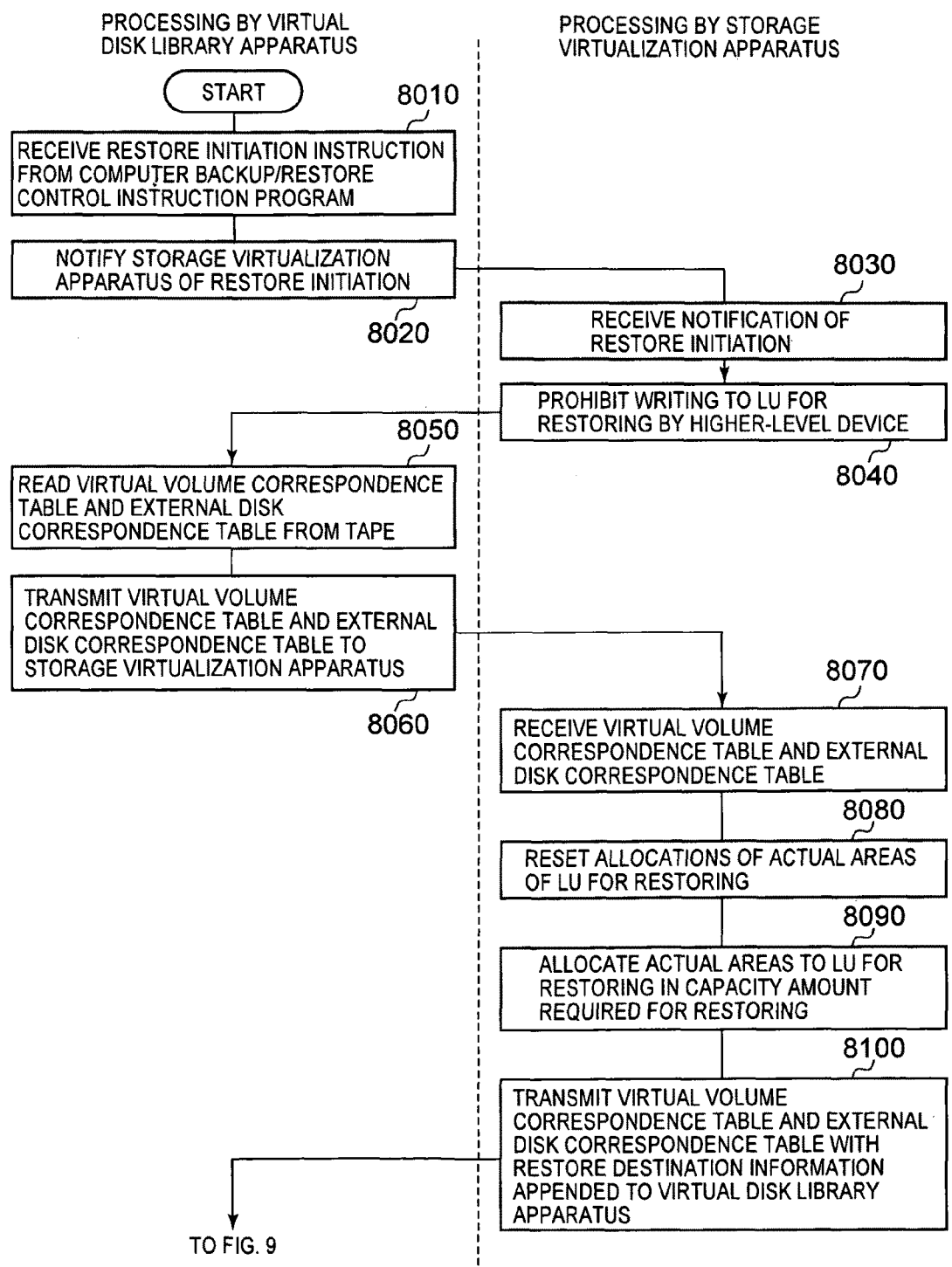
FIG. 8 shows a portion of an example of the processing flow for restore processing in the first embodiment of the invention.
Figure 9:
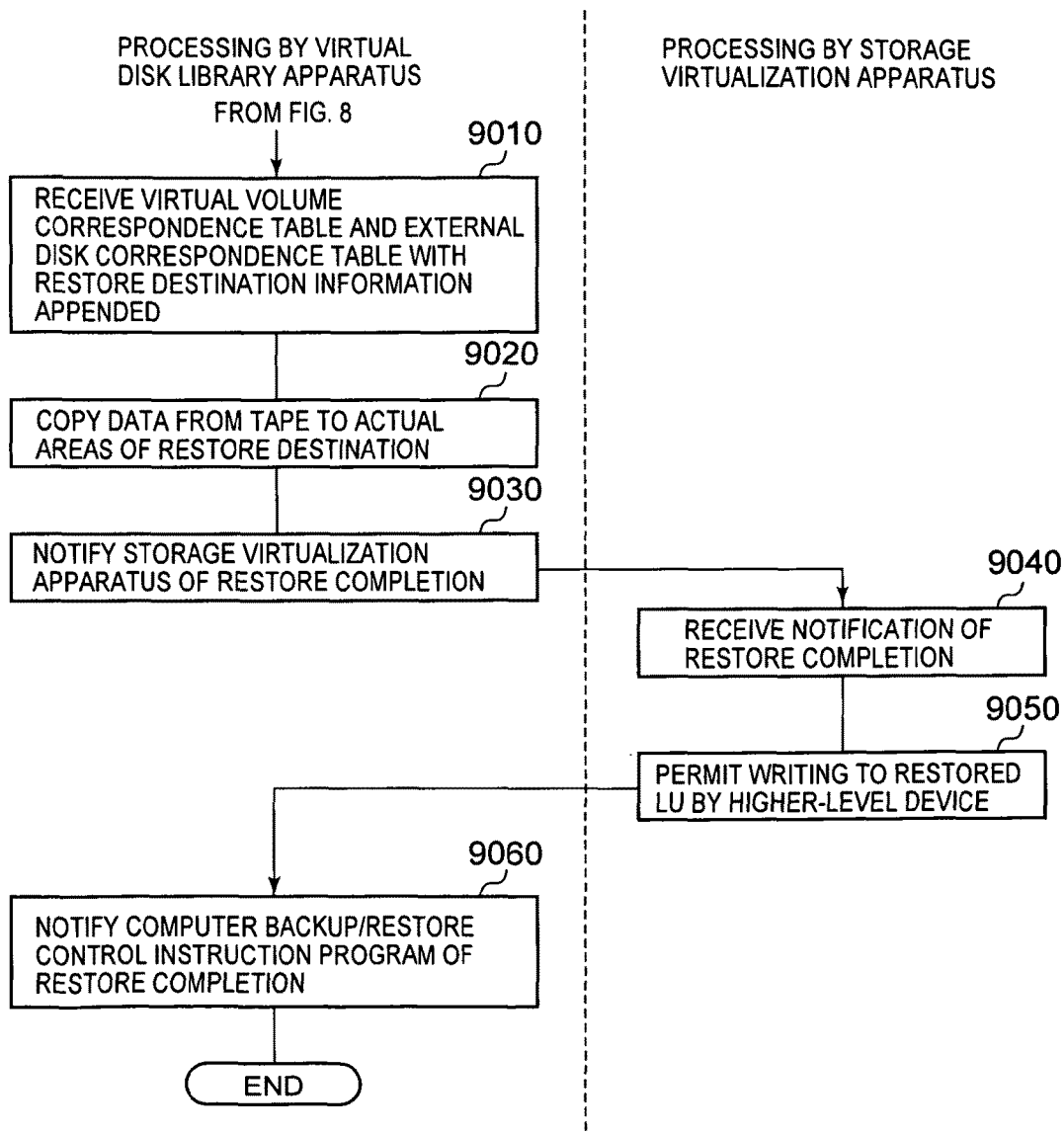
FIG. 9 shows the remaining portion of an example of the processing flow for restore processing in the first embodiment of the invention.

The combination of FIG. 8 and FIG. 9 show the processing flow of restore processing.

In step 8010, the backup/restore control instruction program 102 of the host computer 100 transmits a restore initiation instruction for a LU for restoring to the virtual disk library apparatus 120, and the instruction is received by the virtual disk library apparatus 120. For example, in the restore initiation instruction, the tape 126 to serve as the restore source and the LUN of the virtual volume 112 for restoring (the LUN of the LU for restoring) may be specified. The LU which is the restore destination may be the LU for restoring (in other words, the backed-up LU), or may be a LU different from the LU for restoring. Specifically, when for example the LUN of the backed-up LU is 0, and the backed-up LU is to be restored, the LUN of the LU for restoring is also 0, but the LU which is the restore destination may be the LU for restoring (the LU LUN0), or may be a different LU. Further, the tape 126 serving as the restore source need not be specified; in this case, for example, the tape 126 on which is stored the LU specified for restoring is identified from among above-described tapes, not shown, and the identified tape 126 may serve as the restore source. Further, a plurality of LUs may together serve as the LU for restoring. In this processing flow, a virtual volume 112b is the LU for restoring, and also the restore destination. In place of a tape 126, the LUN of a tape LU may be specified. A tape LU is a logical unit corresponding to all or a portion of the storage space of one or more tapes 126.

In step 8020, for example in response to a restore initiation instruction, the restore control program 314 of the virtual disk library apparatus 120 notifies the storage virtualization apparatus 110 of the initiation of a restore operation for the LU for restoring 112b.

In step 8030, the storage virtualization apparatus 110 receives the restore initiation notification for the LU for restoring 112b.

In step 8040, in response for example to the above restore initiation notification, the disk control program 211 of the storage virtualization apparatus 110 prohibits writing to the LU for restoring 112b from a higher-level device (for example, from the host computer 100). This processing is for example effectively similar to that of step 7040.

In step 8050, for example in response to notification of the write-prohibited state from the storage virtualization apparatus 110, the restore control program 314 of the virtual disk library apparatus 120 reads the virtual volume correspondence table 212 and external disk correspondence table 213 from the tape 126 which is the restore source.

In step 8060, the restore control program 314 transmits to the storage virtualization apparatus 110 the virtual volume correspondence table 212 and external disk correspondence table 213 read from the tape 126.

In step 8070, the disk control program 211 of the storage virtualization apparatus 110 receives the virtual volume correspondence table 212 and external disk correspondence table 213 transmitted from the virtual disk library apparatus 120.

In step 8080, the disk control program 211 resets allocation of actual areas of the LU for restoring 112b. Specifically, for example, the disk control program 211 resets the SN (530) of the LU for restoring 112b in the physical/logical management table 500, and changes the In-use (450) value in the segment management table 400 for the reset segment number to 0 (unused).

In step 8090, the disk control program 211 references the received virtual volume correspondence table 212 and external disk correspondence table 213 (the virtual volume correspondence table 212 and external disk correspondence table 213 stored on the tape 126), and allocates an actual area to the LU for restoring 112b in the capacity amount necessary for restoring. For example, the disk control program 211 references the received virtual volume correspondence table 212 and external disk correspondence table 213, and references the segment management table 400 for the number of segments to be copied in the restore operation, and allocates segments for which the In-use (450) value is 0 (unused) to the LU for restoring 112b. When the size of segments which can be allocated to the LU for restoring 112b and the size of segments in which data elements stored on the tape 126 (that is, the backed-up data elements) had been stored are not the same, the number of segments allocated to the LU for backup at the time of backup, and the number of segments allocated to the LU for restoring 112b at the time of restoring, may be different.

In step 8100, the disk control program 211 transmits, to the virtual disk library apparatus 120, the virtual volume correspondence table 212 and external disk correspondence table 213, with restore destination information appended. Specifically, for example, as shown in FIG. 10, the disk control program 211 appends the restore destination segment number 1060 to the physical/logical management table 500, so that data elements which had been stored in the physical area corresponding to segment number 1030 are restored to the physical area corresponding to the segment indicated by the restore destination segment number 1060. The restore destination segment number 1060 is the number of the segment allocated in step 8090. The disk control program 211 updates to the latest state both the segment management table 400 and the external disk correspondence table 213, and transmits these to the virtual disk library apparatus 120.

In step 9010, the restore control program 314 of the virtual disk library apparatus 120 receives the virtual volume correspondence table 212 and external disk correspondence table 213, with restore destination information appended, which have been transmitted from the storage virtualization apparatus 110.

In step 9020, the restore control program 314 references the virtual volume correspondence table 212 and external disk correspondence table 213 to which restore destination information has been appended, while copying (restoring) backup data elements from the tape 126 on which the backup data elements (that is, the data elements for restoring) are stored to the physical area on the disk 122 which is to become the actual area of the restore destination. Specifically, when for example restoring the LU LUN0 (1011) shown in FIG. 10, the restore control program 314 copies backup data elements stored in the physical area corresponding to segment number 1 (1021) (at this time, data elements stored on tape 126) to the physical area corresponding to the segment with restore destination segment number 1 (1061). The position of the physical area of the segment with restore destination segment number 1 (1061) can be identified by referencing the segment management table 400 and external disk correspondence table 213. Similarly, the restore control program 314 copies backup data elements which had been stored in the physical area corresponding to the segment of segment number 2 (1022) from the tape 126 to the physical area corresponding to the segment of restore destination segment number 2 (1062), and copies the backup data elements which had been stored in the physical area corresponding to the segment of segment number 3 (1023) from the tape 126 to the physical area corresponding to the segment of restore destination segment number 7 (1063). The restore control program 314 can calculate where on the tape 126 backup data elements stored in physical areas corresponding to segments of which segment numbers are stored based on, for example, the order from the top of a segment number in a segment number group corresponding to the backed-up LU in the physical/logical management table 500, the sizes of segments stored in the backed-up data, and the ratio of compression (compression ratio) executed by the tape drive 123 at the time of storing of data elements to tape 126. Or, in place of this method, for example, when the backup control program 313 copies data elements to the tape 126 from the physical area corresponding to the segments of the backup source, the addresses on the copy destination tape 126 may be appended to the segment numbers of the copy source segments in the physical/logical management table 500, and at the time of the restore operation, the restore control program 314 may reference this physical/logical management table 500 to identify the stored locations on the tape 126 of backup data elements which had been stored in the physical areas corresponding to segments with which segment numbers.

In step 9030, after completion of restoring of the LU for restoring, the restore control program 314 notifies the storage virtualization apparatus 110 of the completion of restoring of the LU for restoring 112b.

In step 9040, the storage virtualization apparatus 110 receives the notification of the completion of restoring of the LU for restoring.

In step 9050, in response to the notification of restore completion, the disk control program 211 of the storage virtualization apparatus 110 permits writing to the LU for restoring 112b from a higher-level device (the host computer 100) (that is, cancels the write-prohibited state). The disk control program 211 can notify the virtual disk library apparatus 120 of the cancellation of the write-prohibited state.

In step 9060, in response for example to the notification of cancellation of the write-prohibited state, the restore control program 314 of the virtual disk library apparatus 120 notifies the backup/restore control instruction program 102 of the host computer 100 of the completion of restoring of the LU for restoring 112b.

The above is an explanation of the processing flow of restore processing. In this processing flow, for example in step 9050 the disk control program 211 of the storage virtualization apparatus 110 may copy the restore destination SN 1060 appended to the physical/logical management table 500 to the segment number 1030, and may delete the column of restore destination SNs 1060. By this means, the physical/logical management table 500 can be put into the most recent state (that is, the state in agreement with completion of restoring of the LU for restoring 112b).

Thus by means of the above-described first embodiment, by transmitting the virtual volume correspondence table 212 and external disk correspondence table 213 between the storage virtualization apparatus 110 and the virtual disk library apparatus 120, during volume-unit backup of virtual volumes 112a, 112b which present to a higher-level device virtual capacities different from the actual areas, backup of the actual capacity amount rather than the virtual capacity can be performed. Further, during a restore operation, restoring of the actual capacity amount at the time of backup, rather than the virtual capacity of the virtual volume which is the restore destination, can be performed.

<Second Embodiment>

Below, a second embodiment of the invention is explained. The following explanation primarily addresses points of difference with the first embodiment, and points in common with the first embodiment are omitted or simplified.

Figure 11:
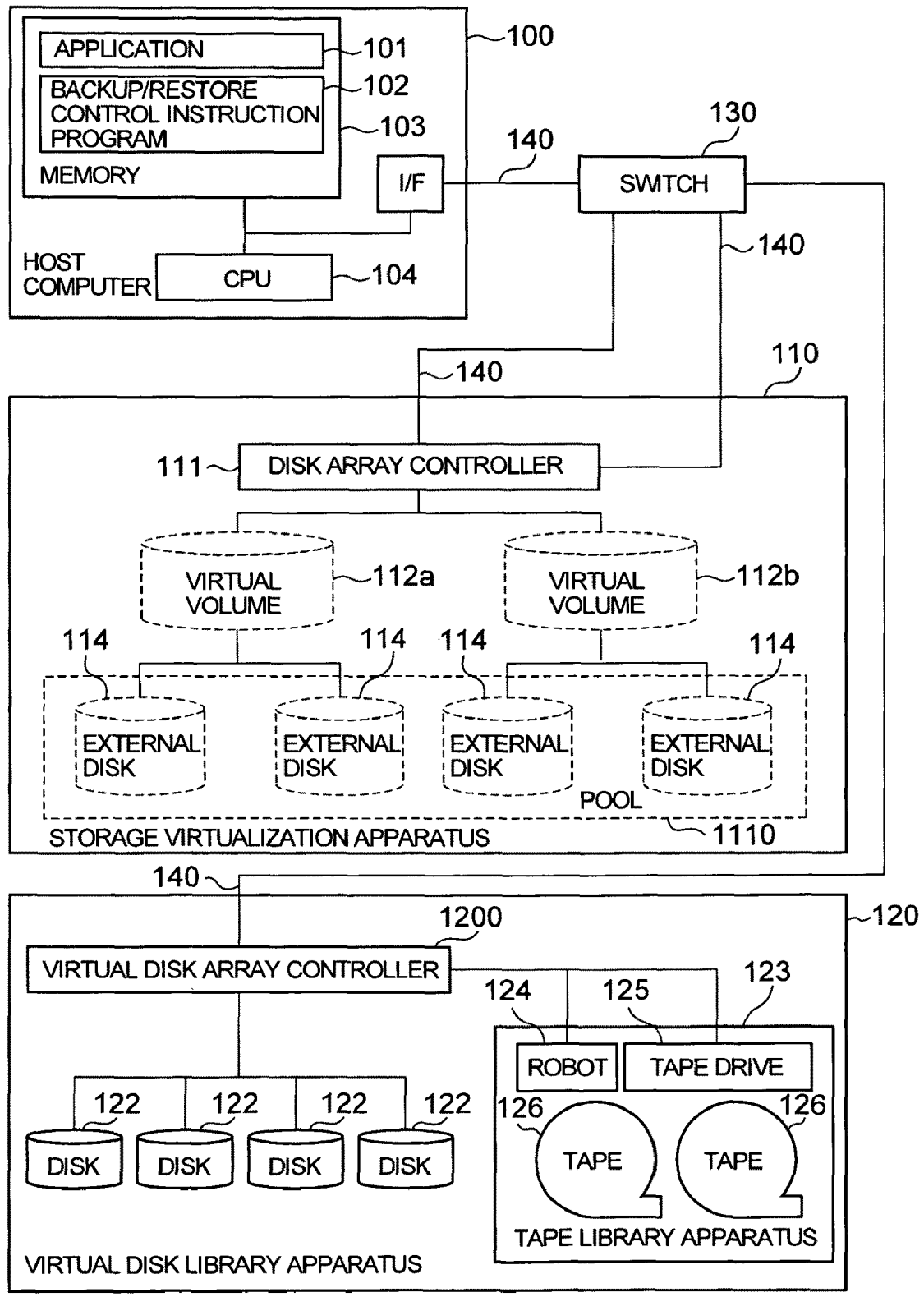
FIG. 11 shows an example of the configuration of a computer system in a second embodiment of the invention.
Figure 12:
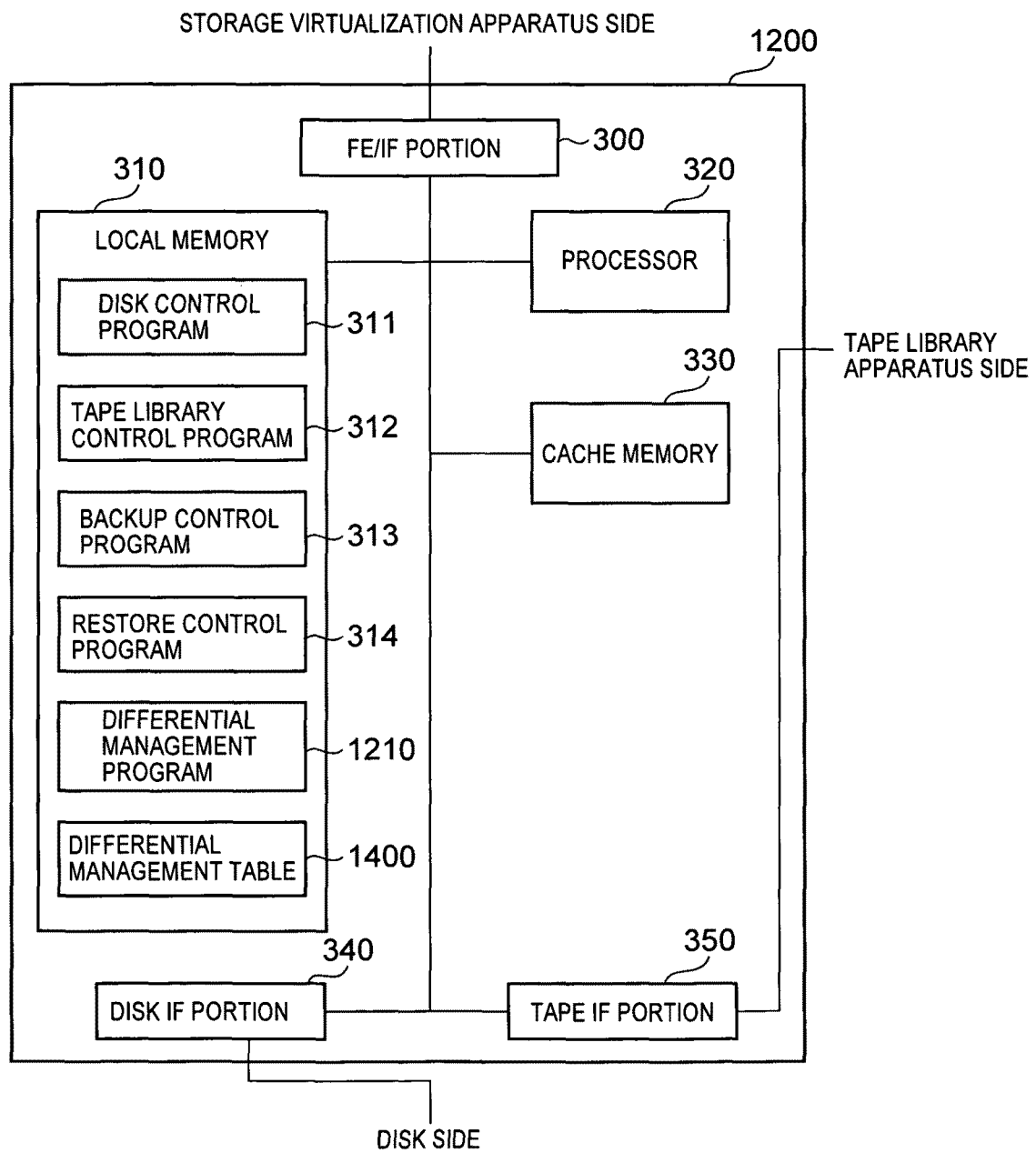
FIG. 12 shows an example of the configuration of the virtual disk array controller of a virtual disk library apparatus in the second embodiment of the invention.
Figures 13, 14, 15:
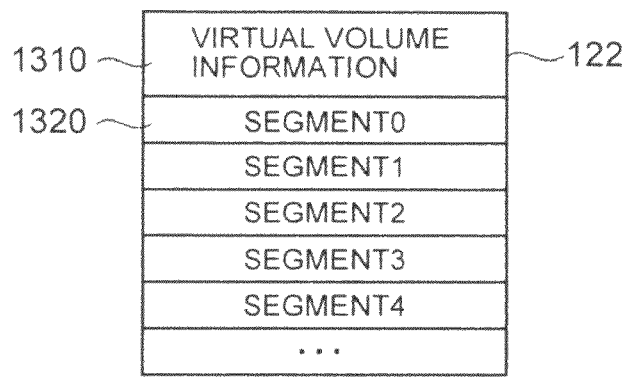
FIG. 13 shows an example of the configuration of a disk.
FIG. 14 shows an example of the configuration of a differential management table.
FIG. 15 shows an example of a differential bitmap.

FIG. 11 shows an example of the configuration of a computer system in the second embodiment of the invention. FIG. 12 shows an example of the configuration of the virtual disk array controller 1200 in the second embodiment of the invention. FIG. 13 shows an example of storage areas on a disk 122. The configuration example of the disk array controller 111 is the same as in the first embodiment.

The backup/restore control instruction program 102 has a function for outputting an instruction to the storage virtualization apparatus 110, prior to backup initiation, to prohibit writing to the LU for backup, and a function for outputting an instruction to the storage virtualization apparatus 110, after the completion of backup, to permit writing to the LU for backup. The backup/restore control instruction program 102 further has a function for outputting an instruction to the storage virtualization apparatus 110, prior to restore initiation, to prohibit writing to the LU for restoring, and a function for outputting an instruction to the storage virtualization apparatus 110, after the completion of restoring, to permit writing to the LU for restoring.

The storage virtualization apparatus 110 comprises one or more (one, for example) pools 1110 comprising a plurality of external disks 114. A pool 1110 may comprise a single external disk 114. A pool 1110 comprises one or a plurality of external disks 114, and each segment of each external disk 114 corresponds to a physical area of one of the disks 122 among the plurality of disks 122. Hence, it can effectively be said that a pool 1110 comprises a plurality of disks 122. The disk control program 211 has a function for allocating as necessary to a virtual volume 112, as an actual area, a segment from a pool 1110. A pool 1110 is used by a plurality of virtual volumes 112a, 112b, and different storage areas of the same external disk 114 may be used by a virtual volume 112a and a virtual volume 112b. Similarly to the first embodiment, an external disk 114 corresponds to a disk 122, and the correspondence relation is managed using an external disk correspondence table 213. As shown in FIG. 13, the information of a virtual volume correspondence table 212 and external disk correspondence table 213 corresponding to virtual volumes 112a, 112b to which segments are allocated is stored, as virtual volume information 1310, on the disk 122 having the physical areas corresponding to the segments which can be actual areas of the virtual volumes 112a, 112b. For example, virtual volume information 1310 is stored in the beginning portion of the storage area of the disk 122, and thereafter, segments which can be allocated to the virtual volumes 112a, 112b (physical areas) begin. The disk control program 211 has a function to reconstruct the actual areas of the virtual volumes 112a, 112b by referencing the virtual volume information 1310 of the disk 122 comprised by the pool 1110 (a function for updating the virtual volume correspondence table 212 and external disk correspondence table 213 such that the contents are the same as the virtual volume information 1310).

The size of a prescribed area in which the virtual volume information 1310 is stored is set based on the number of physical areas of the disk 122 storing the virtual volume information 1310, and similar. By this means, the virtual volume information 1310 can be prevented from exceeding the prescribed area, even when the size of the virtual volume information 1310 increases as a result of the appending of data to the virtual volume information 1310. Updating of the virtual volume information 1310 is executed by for example the disk control program 211 of the storage virtualization apparatus 110 each time a physical area (segment) of the disk 122 storing the virtual volume information 1310 is allocated to a virtual volume 112a or 112b, or allocation of a physical area (segment) is canceled.

The virtual disk array controller 1200 comprises a differential management program 1210 and a differential management table 1400. In addition, a differential bitmap 1500 (see FIG. 15) is stored on the disk 122.

The differential management program 1210 has a function for using the differential management bitmap 1500 to perform differential management of the disk 122. For example, the differential bitmap 1500 can be used to perform management by setting the bits for storage areas to which writing has been performed to 1 and bits for storage areas to which writing has not been performed to 0.

The differential management table 1400 and differential bitmap 1500 are used to perform differential management of disks 122. As shown in FIG. 14, the disk ID 1410, differential bitmap number 1420, differential management size 1430, and differential bitmap storage position 1440 are stored in the differential management table 1400. The disk ID 1410 is a unique identification number for the disk 122 for which differential management is performed. The differential bitmap number 1420 is a unique identification number for the differential bitmap 1500 corresponding to the disk 122 with the disk ID 1410. The differential management size 1430 indicates the size corresponding to one bit of the differential bitmap. The differential bitmap storage position 1440 indicates where on the disk 122 the differential bitmap is stored. For example, if the differential bitmap storage position 1440 is 100:0-1000 (1441), then storage is 1000 from LBA 0 of disk ID 100. The differential bitmap storage position may indicate that storage is in cache memory 330 rather than on the disk 122, in order to enable faster referencing of the bitmap. One differential bitmap 1500 may for example be prepared for one disk 122. If for example the differential management size 1430 is 1 MB, then in the differential bitmap 1500, 1510a and 1510b are the differential bits corresponding to the blocks from the beginning of the storage area of the disk 122 to 1 MB, and from 1 MB to 2 MB, respectively. When one of the corresponding blocks has been updated (written), the differential bit is inverted. For example, 1510a, 1510b, and 1510e indicate the blocks have not been updated (have not been written), whereas 1510c and 1510d indicate that there has been updating (writing).

The virtual disk library apparatus 120 can determine the segments used as actual areas of a virtual volume 112 on a disk 122 comprised by a pool 1110 by referencing the differential management table 1400 and the differential bitmap 1500. For example, on a disk 122 comprised by a pool 1110, in a state in which none of the segments (storage areas) are allocated as actual areas of virtual volumes 112a, 112b, the differential bitmap 1500 of the disk 122 comprised by the pool 1110 can be reset (for example, cleared to all 0's).

Thereafter, when there is allocation as an actual area of a virtual volume 112, writing always occurs to the physical area allocated as an actual area, and so a physical area for which the bit in the differential bitmap 1500 is inverted (to a 1 bit) can be recognized as a physical area being used as an actual area of a virtual volume 112a, 112b. Bits comprised by a differential bitmap 1500 may each be associated not with a physical area, but with each of a plurality of blocks comprised by a physical area.

Figure 16:
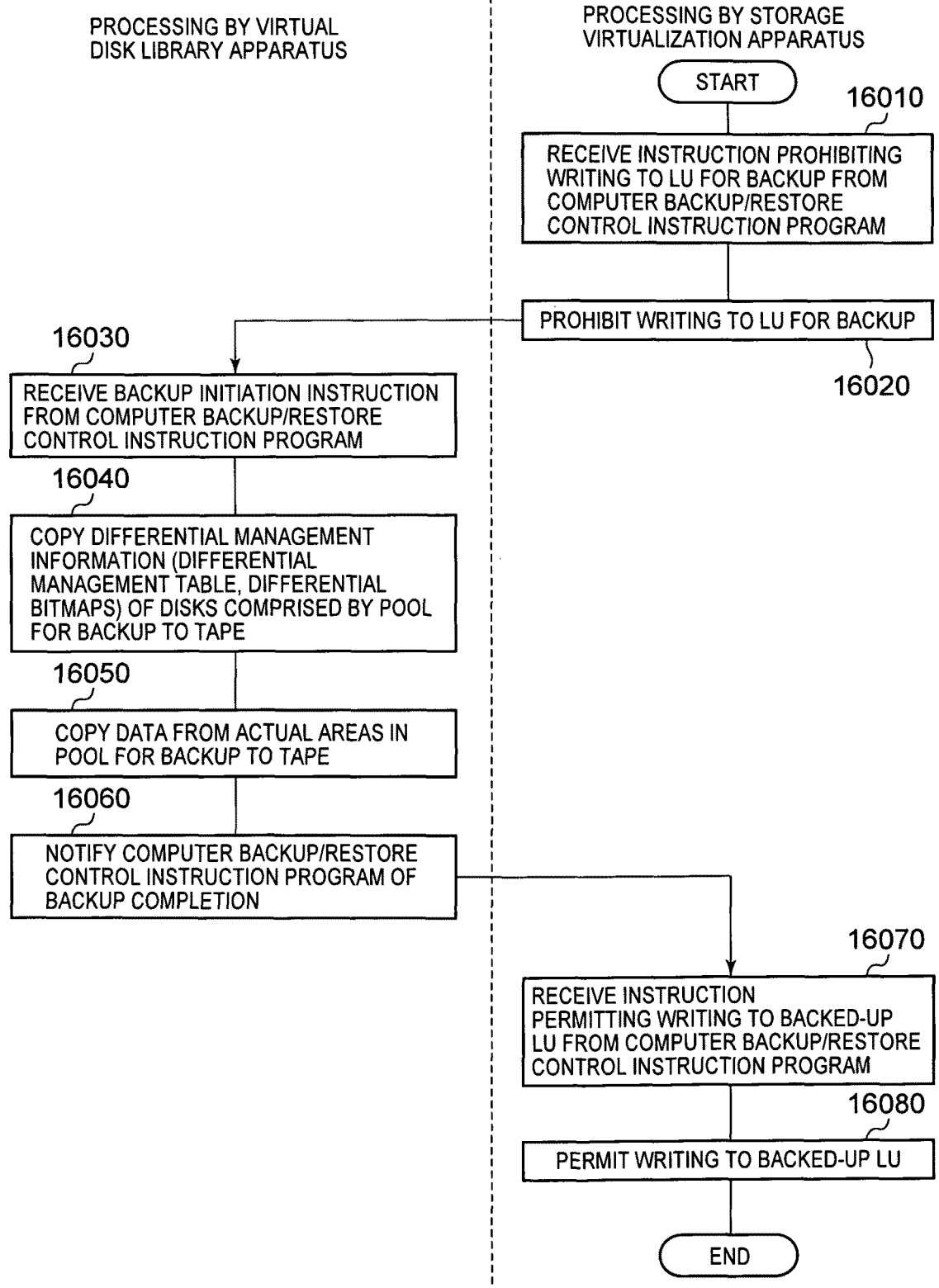
FIG. 16 shows an example of the processing flow for backup processing in the second embodiment of the invention.

FIG. 16 shows the flow of processing in backup processing of the second embodiment of the invention.

In step 16010, the backup/restore control instruction program 102 of the host computer 100 transmits an instruction to the storage virtualization apparatus 110 prohibiting writing to the LU for backup, and the storage virtualization apparatus 110 receives the write-prohibit instruction. Here, the LU for backup is the LU to which are allocated segments within the pool for backup, described below. For example, when pool 1110 is a pool for backup, the virtual volumes 112a and 112b are LUs for backup.

In step 16020, in response to the write-prohibit instruction, the disk control program 211 of the storage virtualization apparatus 110 prohibits writing to the LUs for backup 112a, 112b.

In step 16030, the backup/restore control instruction program 102 of the host computer 100 transmits to the virtual disk library apparatus 120 a backup initiation instruction, specifying a pool for backup, and the virtual disk library apparatus 120 receives this backup initiation instruction. For example, in the backup initiation instruction, the LUNs of all the disks 122 comprised by the pool 1110 for backup, and the tape 126 to serve as the backup destination, may be specified. The LUNs of the disks 112 comprised by the pool 1110 can for example be managed in a table or similar, not shown, in the host computer 100. The LUNs of the disks 122 comprised by the pool 1110 for backup may for example be input manually by a user of the host computer 100, or an identifier of the pool 1110 for backup may be input by the user, so that backup/restore control instruction program 102 identifies the LUNs of disks 122 corresponding to the identifier.

In step 16040, in response to the backup initiation instruction, the backup control program 313 of the virtual disk library apparatus 120 copies, to the tape 126 serving as the backup destination, each of the differential bitmaps 1500 for each of the disks 122 comprised by the pool for backup and the differential management table 1400. The copy destination of the differential bitmaps 1500 and the differential management table 1400 may be the beginning portion of the tape 126 serving as the backup destination, or another prescribed position, or may be an arbitrary position. A table, not shown, may be used to manage, within the virtual disk library apparatus 120, the locations of storage on the tape 126 of the differential bitmaps 1500 and the differential management table 1400.

In step 16050, the backup control program 313 references each of the differential bitmaps 1500 while copying data elements in physical areas corresponding to actual areas in the pool for backup (segments allocated to virtual volumes 112a, 112b) from disks 122 to the tape 126 which is the backup destination. For example, the backup control program 313 references the differential bitmaps 1500, and copies data elements stored in blocks corresponding to inverted bits to the tape 126 which is the backup destination.

In step 16060, after completion of backup of the pool for backup, the backup control program 313 notifies the backup/restore control instruction program 102 of the host computer 100 of the completion of backup of the pool for backup.

In step 16070, in response to the notification of backup completion, the backup/restore control instruction program 102 of the host computer 100 transmits to the storage virtualization apparatus 110 an instruction to permit writing to backed-up LUs, and the storage virtualization apparatus 110 receives this write-permit instruction.

In step 16080, in response to the write-permit instruction, the disk control program 211 of the storage virtualization apparatus 110 permits writing to the backed-up LUs.

Figure 17:
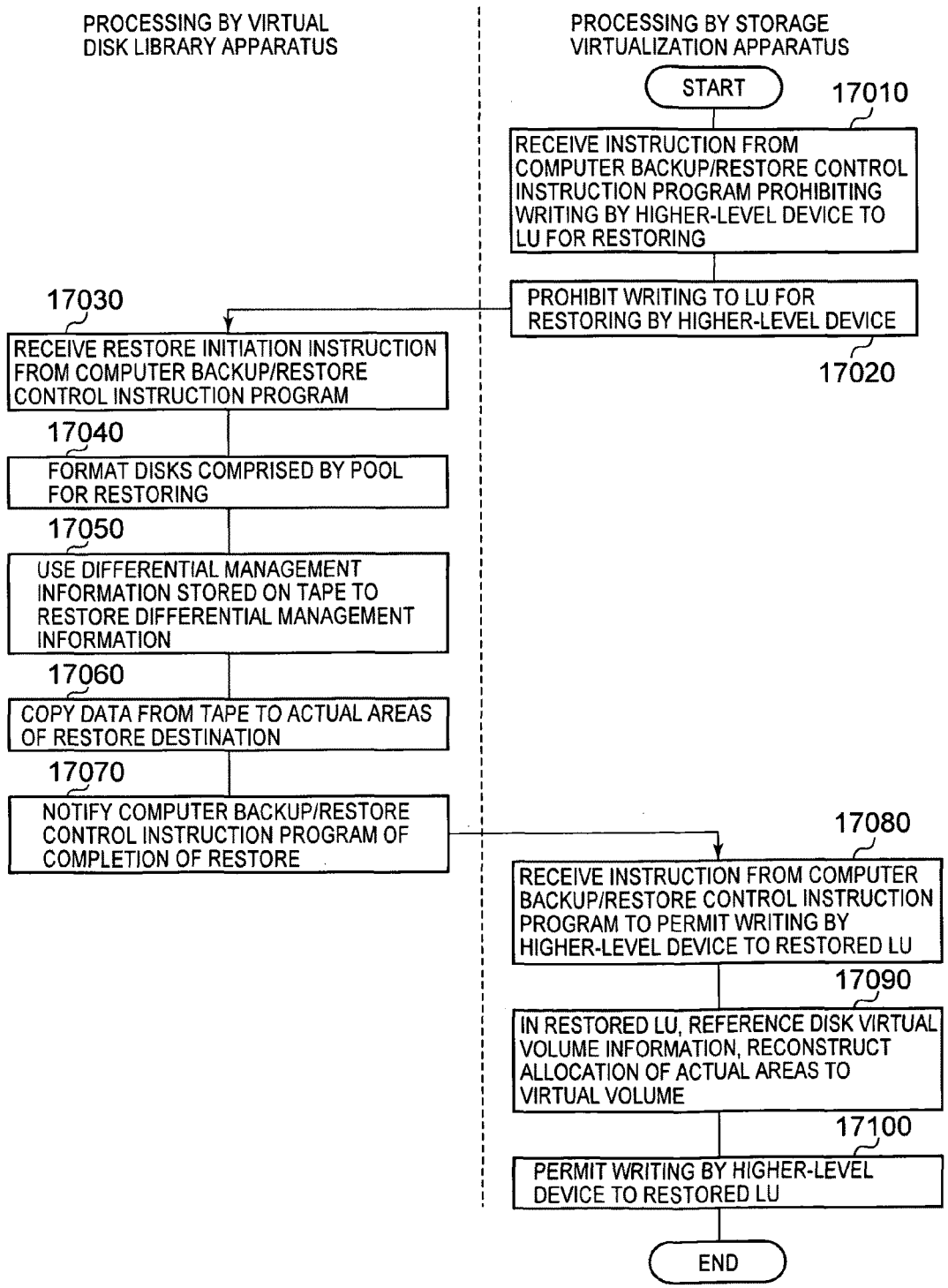
FIG. 17 shows an example of the flow of processing for restore processing in the second embodiment of the invention.

FIG. 17 shows the processing flow of restore processing in the second embodiment of the invention.

In step 17010, the backup/restore control instruction program 102 of the host computer 100 transmits, to the storage virtualization apparatus 110, an instruction prohibiting writing by a higher-level device to the LUs to be restored, and the instruction is received by the storage virtualization apparatus 110. In this processing flow, similarly to the first embodiment, the restore destination LUs and the LUs for restoring (that is, the LUs which are the backup source) are assumed to be the same. Restoring is performed in pool units, similarly to backup, and so the LUs for restoring are virtual volumes 112a, 112b.

In step 17020, the disk control program 211 of the storage virtualization apparatus 110 prohibits writing by higher-level devices to the LUs for restoring 112a, 112b.

In step 17030, the backup/restore control instruction program 102 of the host computer 100 transmits, to the virtual disk library apparatus 120, a restore initiation instruction specifying the pool for restoring, and the virtual disk library apparatus 120 receives this restore initiation instruction. For example, in the restore initiation instruction, the tape 126 to serve as the restore source, and the LUNs of all disks 122 comprised by the pool for restoring 1110, are specified.

In step 17040, the restore control program 314 of the virtual disk library apparatus 120 formats all the disks 122 comprised by the pool for restoring 1110 (that is, all the disks 122 serving as the restore destination). In this formatting, for example, all areas (all segments) of each disk 122 comprised by the pool 1110 are overwritten with 0's.

In step 17050, the restore control program 314 of the virtual disk library apparatus 120 restores each of the differential bitmaps 1500 corresponding to each of the disks 122 comprised by the pool for restoring 1110 to the state at the time of backup, using the differential bitmaps 1500 stored on the tape 126 which is the restore source (that is, causes each of the differential bitmaps 1500 corresponding to each disk 122 comprised by the pool for restoring 1110 to have the same content as the differential bitmaps 1500 stored on the tape 126 which is the restore source).

In step 17060, the restore control program 314 references the restored differential bitmaps 1500 while copying (restoring) backup data from the tape 126 which is the restore source to the physical areas of disks 122 which are the actual areas of the restore destination. The locations to which backup data is copied are controlled by for example executing backups according to prescribed rules and executing the restore operation based on the prescribed rules. Specifically, for example, at the time of backup, copying is executed in order from the segments with the smallest segment numbers, on the disks 122 with the smallest LUNs, among the disks 122 comprised by the pool for backup. At the time of restore also, restoring is performed in order from the backup data stored to segments with the smallest segments numbers on the disks 122 with the smallest LUNs. The starting and ending locations of backup data storing one segment on the tape 126 can be identified based on the actual ratio of compression (compression ratio) of the tape drive 123.

In step 17070, after completion of restoring of the pool for restoring, the restore control program 314 notifies the backup/restore control instruction program 102 of the host computer 100 of the completion of restoring of the pool for restoring.

In step 17080, in response to the notification of restore completion, the backup/restore control instruction program 102 of the host computer 100 transmits, to the storage virtualization apparatus 110, an instruction to permit writing by a higher-level device to the restored LUs 112a, 112b, and the storage virtualization apparatus 110 receives the write-permit instruction.

In step 17090, in response to the write-permit instruction, the disk control program 211 of the storage virtualization apparatus 110 references the virtual volume information 1310 of each disk 122 in the restored LUs 112a, 112b, and reconstructs allocation of actual areas (segments) to the virtual volumes 112a, 112b. Specifically, the disk control program 211 updates the virtual volume correspondence table 212 and external disk correspondence table 213 such that the contents are the same as the virtual volume information 1310 for each disk 122.

In step 17100, the disk control program 211 permits writing by a higher-level device to the restored LUs 112a, 112b.

Thus according to the above-described second embodiment, through differential management of the disks 122 comprised by the pool 1110 in the virtual disk library apparatus 120, backup of the actual capacity amount is possible. In the case of a restore operation, restoring of the actual capacity amount for which backup has been performed is possible. Each of the differential bitmaps 1500 may be stored in control memory 310, instead of or in addition to being stored on disks 122. Conversely, the differential management table 1400 may be stored on disks 122 instead of or in addition to being stored in control memory 310.

The following is a summary of the points of difference between the first embodiment and the second embodiment.

In the first embodiment, backup processing and restore processing can each be performed in virtual volume units. Specifically, for example, when the object of backup and of restore is a virtual volume 112b, in backup processing data stored in actual areas (segments) allocated to the virtual volume 112b is copied to a tape 126 by transmitting the virtual volume correspondence table 212 and external disk correspondence table 213 from the storage virtualization apparatus 110 to the virtual disk library apparatus 120. In restore processing, the data of the actual capacity amount of the virtual volume 112b is copied from the tape 126 to disks 122. However, upon completion of the restore operation, the numbers of segments allocated to the virtual volume 112b and the numbers of segments allocated to the virtual volume 112b at the time of backup initiation may not be the same.

On the other hand, in the second embodiment, backup processing and restore processing are each performed in pool units, rather than in virtual volume units. That is, even if for example there was a desire to back up only virtual volume 112b, it would not be possible to back up virtual volume 112b alone; instead, the data stored in allocated segments in the pool 1110 would be backed up. Allocated segments include not only segments allocated to the virtual volume 112b, but also segments allocated to the virtual volume 112a, and so as a result not only virtual volume 112b, but also virtual volume 112a, which receives segments allocated from the same pool 1110. However, in the second embodiment, which segments have been allocated in which disk 122 is managed by the virtual disk library apparatus 120, and so there is no need to transmit virtual volume correspondence tables 212 or external disk correspondence tables 213 from the storage virtualization apparatus 110 to the virtual disk library apparatus 120.

<Third Embodiment>

Below, a third embodiment of the invention is explained. The following explanation primarily addresses points of difference with the first embodiment, and points in common with the first embodiment are omitted or simplified.

Figure 18:
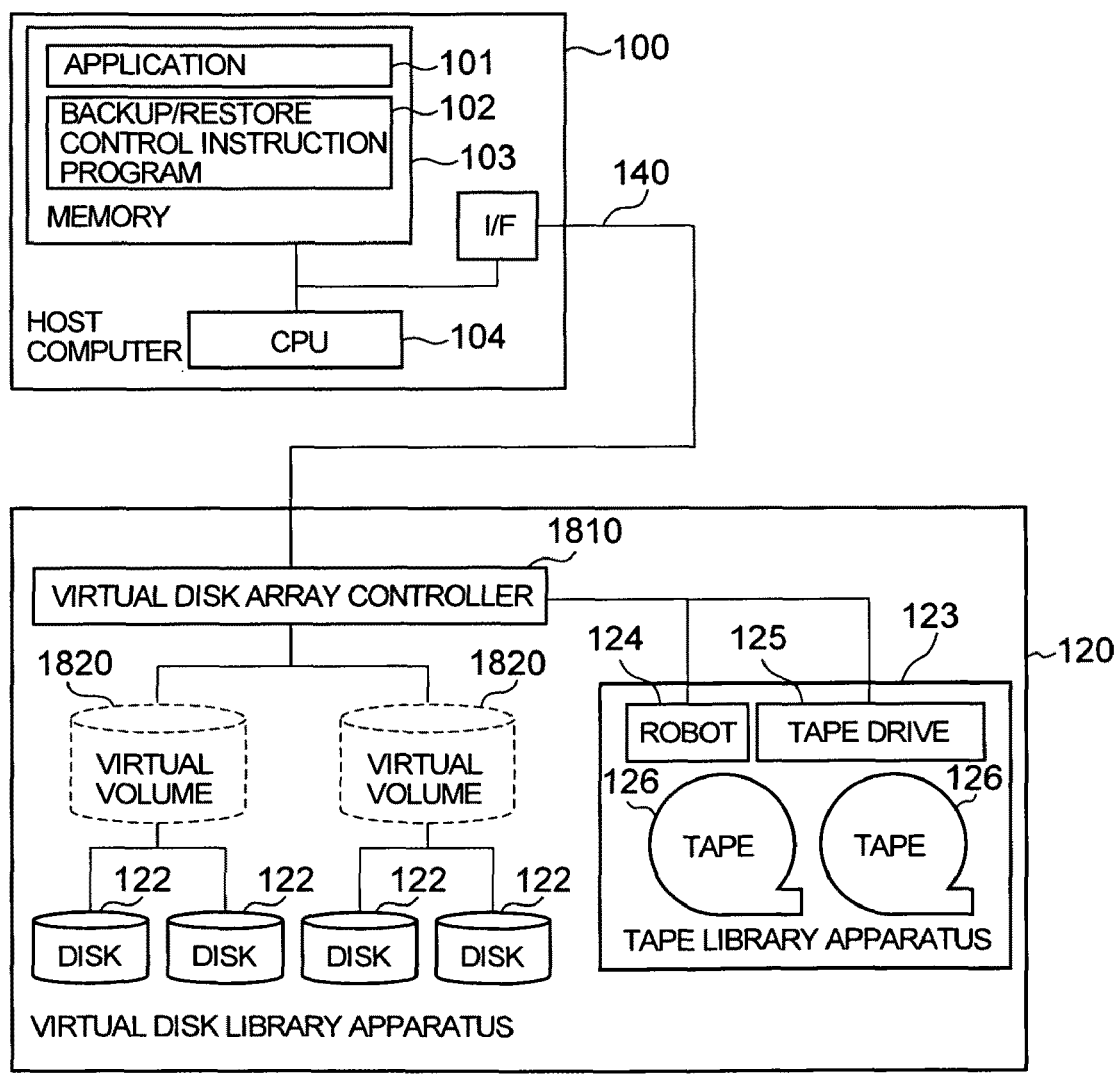
FIG. 18 shows an example of the configuration of a computer system in a third embodiment of the invention.
Figure 19:
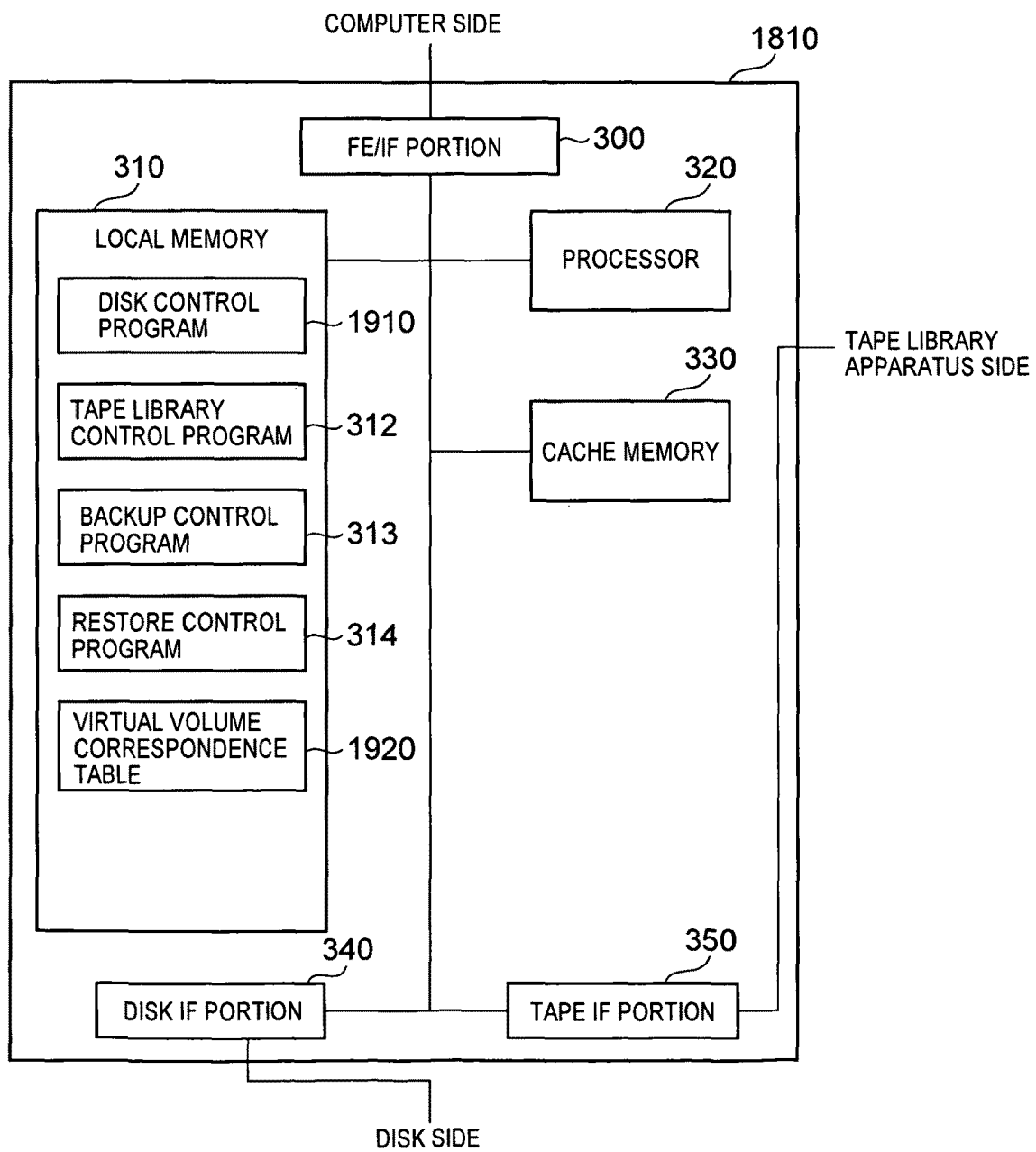
FIG. 19 shows an example of the configuration of the virtual disk array controller of the virtual disk library apparatus in the third embodiment of the invention.

FIG. 18 shows an example of the configuration of a computer system in the third embodiment of the invention. FIG. 19 shows an example of the configuration of the virtual disk array controller 1810 in the third embodiment.

The host computer 100 and virtual disk library apparatus 120 are connected using fiber channel 140, and exchange data, processing requests, and similar. The host computer 100 and virtual disk library apparatus 120 may be connected by a LAN (Local Area Network) or other communication network, or may be connected by dedicated circuits or similar.

The virtual disk library apparatus 120 comprises the virtual disk array controller 1810, a plurality of virtual volumes 1820, disks, 122, and a tape library apparatus 123.

The virtual disk array controller 1810 comprises a FE/IF portion 300, which is the interface with the host computer 100; local memory (hereafter control memory) 310, which stores a disk control program 1910, tape library control program 312, backup control program 313, restore control program 314, and virtual volume correspondence table 1920; a processor (for example, a CPU; hereafter called a control processor) 320, which executes the disk control program 1910, tape library control program 312, backup control program 313, restore control program 314, and virtual volume correspondence table 1920; cache memory 330, which temporarily stores information; a disk IF portion 340, which interfaces with disks 122; and, a data IF portion 350, which interfaces with the tape library apparatus 123.

The disk control program 1910 has a function for using a virtual volume correspondence table 1920 to handle a virtual volume 1820 which presents a virtual capacity to the host (for example, an application 101). The actual areas of the virtual volume 1820 are segments on a disk 122; a function is provided to present to the host a virtual capacity equal to or greater than the actual capacity as the storage capacity of the virtual volume 1820. A function is also provided for managing and controlling disks 122 of the virtual disk library apparatus 120.

The segment management table 2000 of FIG. 20 and the physical/logical management table 2100 of FIG. 21 together constitute a virtual volume correspondence table 1920.

The segment management table 2000 is the same as the segment management table 400 of FIG. 4, other than the fact that the external disk ID 410 in the segment management table 400 has been changed to a disk ID 2010. The disk ID 2010 is a unique identification number for a disk 122, determined by the disk control program 1910.

The physical/logical management table 2100 is the same as the physical/logical management table 500 of FIG. 5.

Figure 22:
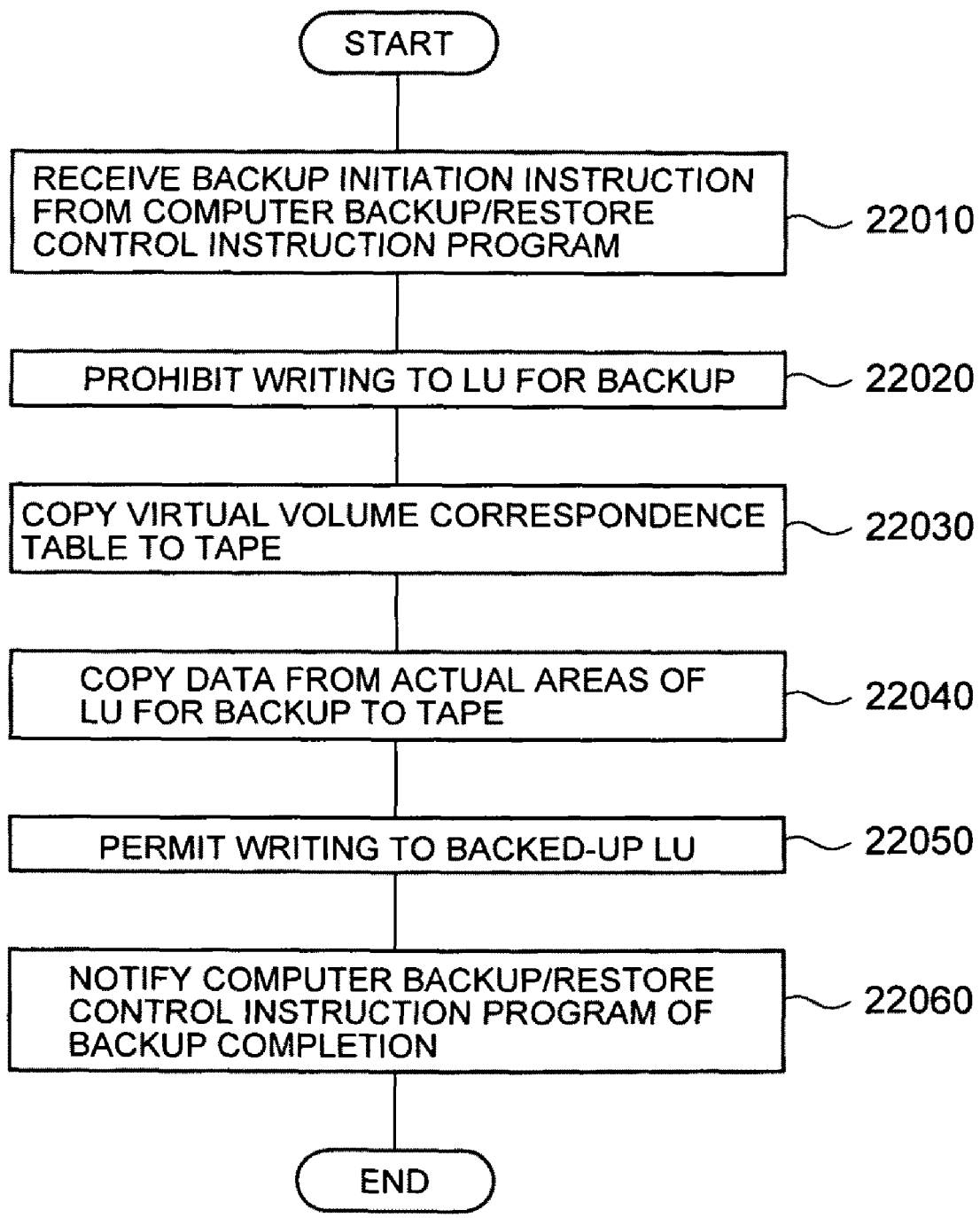
FIG. 22 shows an example of the processing flow for backup processing in the third embodiment of the invention.

FIG. 22 shows the processing flow in backup processing of the third embodiment of the invention.

In step 22010, the backup/restore control instruction program 102 of the host computer 100 transmits a backup initiation instruction for the LU for backup 112b to the virtual disk library apparatus 120, and the virtual disk library apparatus 120 receives this backup initiation instruction.

In step 22020, in response to the backup initiation instruction, the backup control program 313 of the virtual disk library apparatus 120 prohibits writing to the LU for backup 112b by a higher-level device.

In step 22030, the backup control program 313 copies the virtual volume correspondence table 1920 necessary at the time of restore of the LU for backup 112b to the tape 126 which is the backup destination.

In step 22040, the backup control program 313 references the virtual volume correspondence table 1920 while copying data elements stored in actual areas of the LU for backup 112b from the disk 122 to the tape 126 which is the backup destination.

In step 22050, after completion of backup of the LU for backup, the backup control program 313 permits writing to the backed-up LU 112b.

In step 22060, the backup control program 313 notifies the backup/restore control instruction program 102 of the host computer 100 of the completion of backup of the backed-up LU 112b.

Figure 23:
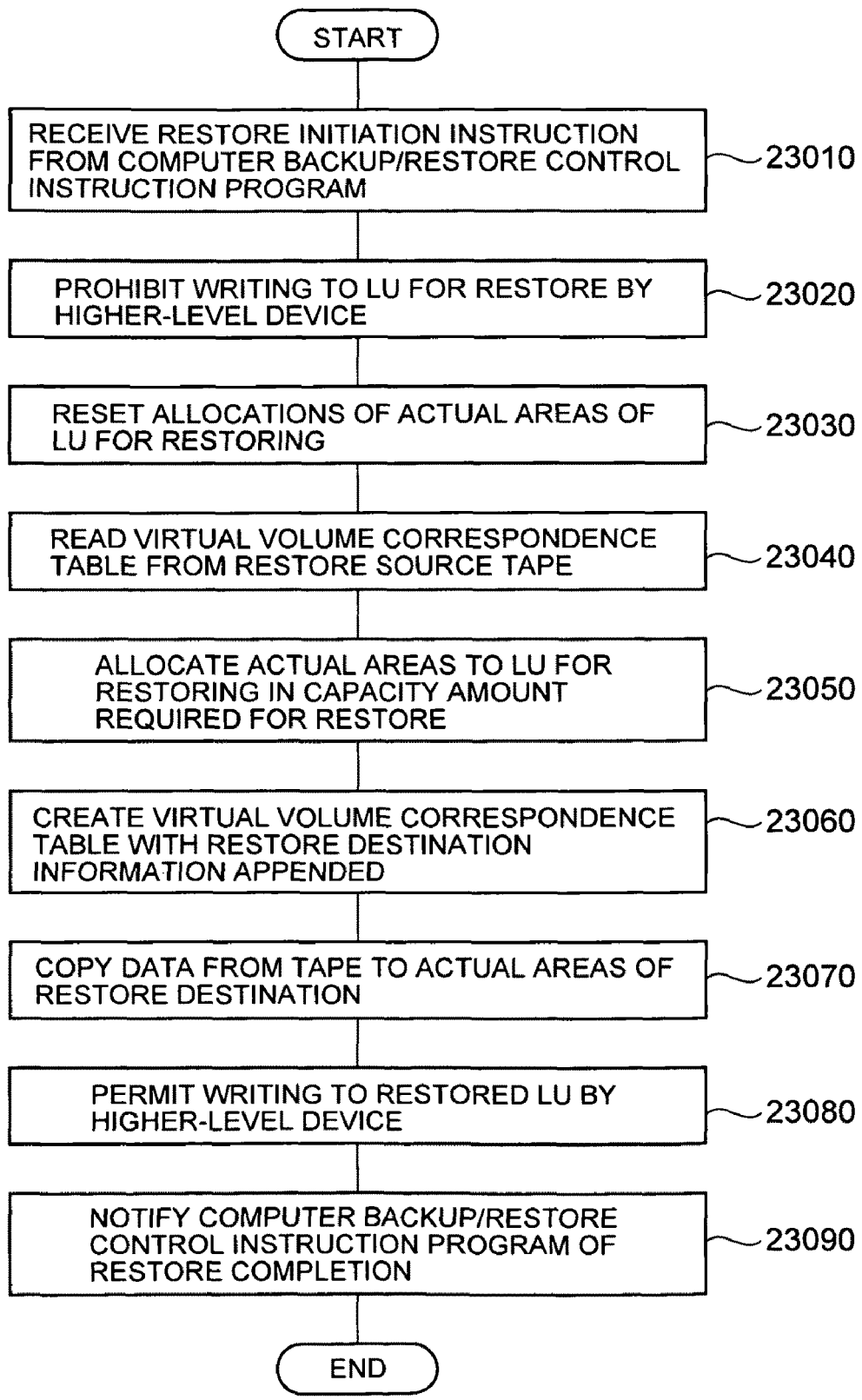
FIG. 23 shows an example of the processing flow for restore processing in the third embodiment of the invention; and, FIG. 24 shows an example of the processing flow for restore processing in a fourth embodiment of the invention.

FIG. 23 shows the processing flow of restore processing in the third embodiment of the invention.

In step 23010, the backup/restore control instruction program 102 of the host computer 100 transmits a restore initiation instruction for the LU for restoring 112b to the virtual disk library apparatus 120, and the virtual disk library apparatus 120 receives this restore initiation instruction.

In step 23020, in response to the restore initiation instruction, the restore control program 314 of the virtual disk library apparatus 120 prohibits writing by a higher-level device to the LU for restoring 112b.

In step 23030, the restore control program 314 resets the allocation of actual areas of the LU for restoring 112b.

In step 23040, the restore control program 314 reads the virtual volume correspondence table 1920 from the tape 126 which is the restore source.

In step 23050, the restore control program 314 references the virtual volume correspondence table 1920 stored on the tape 126, and allocates actual areas, in the actual capacity amount necessary for the restore operation, to the LU for restoring 112b.

In step 23060, the restore control program 314 creates a virtual volume correspondence table with the restore destination information appended, as shown in FIG. 10.

In step 23070, the restore control program 314 references the virtual volume correspondence table with restore destination information appended, while copying (restoring) data elements from the tape 126 on which is stored the backup data to actual areas of the restore destination.

In step 23080, after completion of restoring of the LU for restoring, the restore control program 314 permits writing by a higher-level device to the restored LU 112b.

In step 23090, the restore control program 314 notifies the backup/restore control instruction program 102 of the host computer 100 of the completion of restoring of the restored LU.

According to the above-described third embodiment, in a system comprising a host computer 100 and a virtual disk library apparatus 120, a virtual volume correspondence table 1920 can be used to back up the actual capacity amount. In the event of a restore operation, restoring not of the virtual capacity of the restore destination virtual volume, but of the backed-up actual capacity amount is possible.

<Fourth Embodiment>

Below, a fourth embodiment of the invention is explained. The following explanation primarily addresses points of difference with the third embodiment, and points in common with the third embodiment are omitted or simplified.

The example of the configuration of a computer system of the fourth embodiment is the same as in the third embodiment. The flow of backup processing is also the same as in the third embodiment, but a portion of the flow of restore processing is different from that of the third embodiment.

Figure 24:
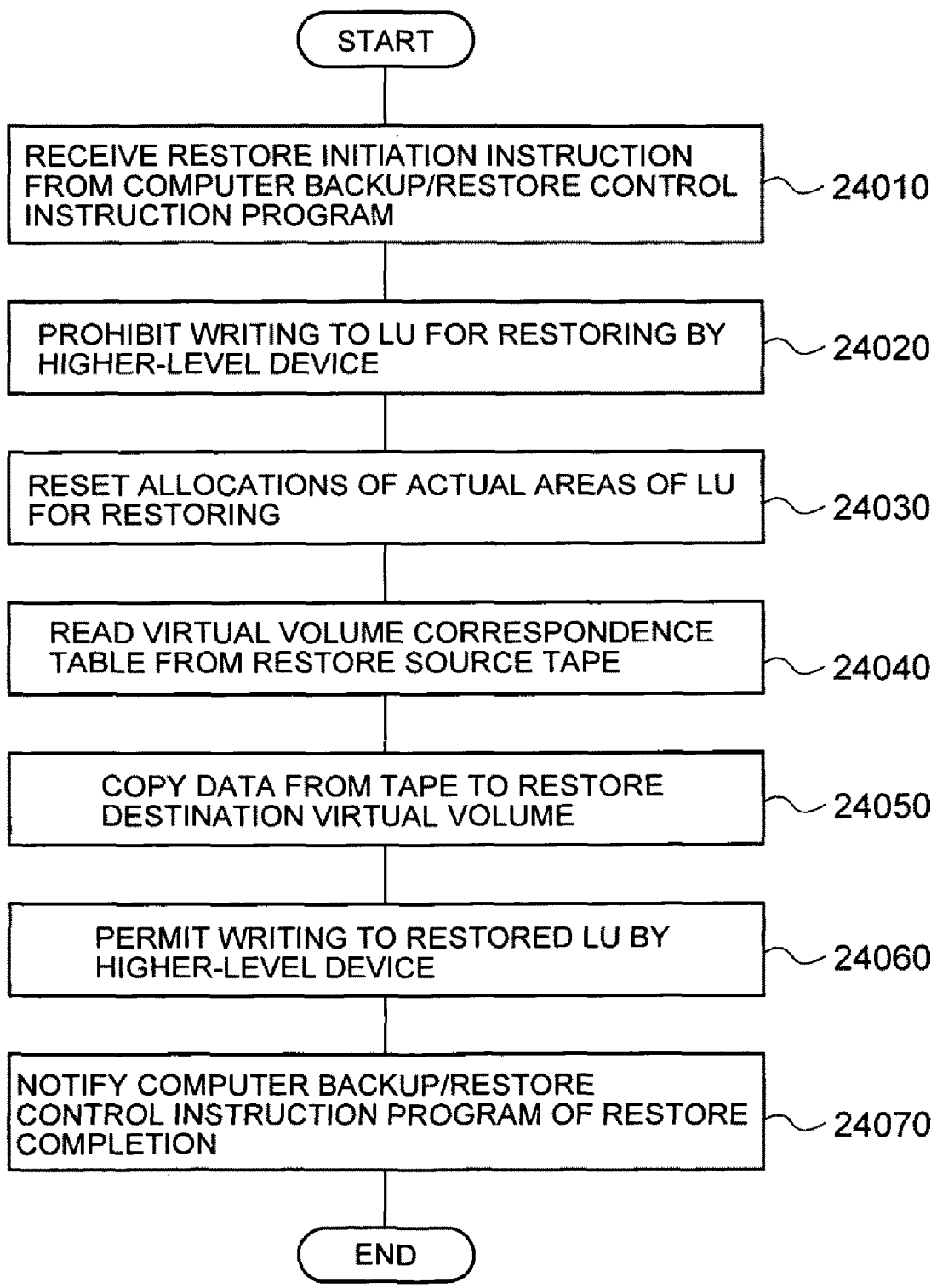

FIG. 24 shows the processing flow of restore processing in the fourth embodiment of the invention.

In step 24010, the backup/restore control instruction program 102 of the host computer 100 transmits a restore initiation instruction for the LU for restoring 112b to the virtual disk library apparatus 120, and the virtual disk library apparatus 120 receives this restore initiation instruction.

In step 24020, in response to the restore initiation instruction, the restore control program 314 prohibits writing by a higher-level device to the LU for restoring 112b.

In step 24030, the restore control program 314 resets the allocation of actual areas of the LU for restoring 112b.

In step 24040, the restore control program 314 reads the virtual volume correspondence table 1920 from the tape 126 which is the restore source.

In step 24050, the restore control program 314 references the virtual volume correspondence table 1920 which had been stored on the tape 126 which is the restore source, while copying (restoring) data elements from the tape 126 on which the backup data is stored to the logical address positions of the restore destination virtual volume 1820. The logical address positions of the virtual volume 1820 are, for example, address positions indicated by LUN LBA (START) 540 and LUN LBA (END) 550, shown in FIG. 21. By writing to the virtual volume 1820, data copy processing (restore processing) is performed while allocating actual areas to the virtual volume 1820, for example by means of technology disclosed in Japanese Patent Laid-open No. 2003-15915.

In step 24060, after completion of restoring of the LU for restoring, the restore control program 314 permits writing by a higher-level device to the restored LU.

In step 24070, the restore control program 314 notifies the backup/restore control instruction program 102 of the host computer 100 of the completion of restoring of the restored LU.

Thus according to the above-described fourth embodiment, in a system comprising a host computer 100 and a virtual disk library apparatus 120, a virtual volume correspondence table 1920 can be used to perform a backup of the actual capacity amount. In the event of a restore operation, restoring of the backed-up actual capacity amount is possible.

The points of difference between the third embodiment and the fourth embodiment may for example be summarized as follows. In the third embodiment, the restore destination is not the virtual volume 112b, but is the segments of disks 122 which are the actual areas of the virtual volume 112b. On the other hand, in the fourth embodiment, the restore destination is the virtual volume 112b itself, and each time restoring (copying) to the virtual volume 112b is performed, the backed-up data elements (data elements to be restored) are written to the segments allocated to addresses corresponding to the restore destination.

In the above, a number of preferred embodiments of the invention have been explained; however, these embodiments are merely examples used in explaining the invention, and the scope of the invention is not limited to these embodiments. This invention can be implemented in a variety of other forms as well.

What is claimed is:

1. A storage control device, comprising:
one or more first storage devices having a plurality of segments, each segment comprising a physical storage area;
a second storage device;

a virtualization portion configured to allocate, in response to a first write request, one or more segments of the plurality of segments to a virtual volume that presents a volume capacity that is larger than a capacity of the one or more allocated segments;

a backup control portion configured to use write management information for the virtual volume that indicates a first set of one or more segments of the plurality of segments that are allocated to the virtual volume and in which writing has occurred, the backup control portion being further configured to back up one or more data elements stored in the first set of one or more segments to the second storage device based on the write management information; and a restore control portion configured to reset allocation of each segment of the plurality of segments allocated to the virtual volume, allocate a second set of one or more segments of the plurality of segments that are not allocated to the virtual volume that correspond to the first set of one or more data segments such that a capacity of the second set of one or more segments is sufficient for storing the one or data elements backed up to the second storage device, and restore the one or data elements from the second storage device to the second set of data segments based on allocations of the second set of one or more segments to the virtual volume.

2. The storage control device according to claim 1, further comprising:

a write execution portion that writes data to the one or more first storage devices according to a second write request, the second write request being based on the first write request that specifies the data for writing to the virtual volume, the second write request specifying the one or more segments of the one or more first storage devices allocated by the virtualization portion and the data for writing to the one or more allocated segments.

3. The storage control device according to claim 2, wherein the storage control device further comprises a storage portion which stores a copy of the write management information upon the backup control portion backing up the one or more data elements stored in the first set of one or more segments in which writing has occurred, and wherein the virtualization portion updates the copy of the write management information to include information indicating an occurrence of writing to the one or more allocated segments specified by the second write request upon the write execution portion writing data to the one or more first storage devices according to the second write request.

4. The storage control device according to claim 3, wherein the restore control portion is configured to read the copy of the write management information and restore the one or more data elements stored in the second storage device to the one or more allocated segments specified by the second write request according to the copy of the write management information.

5. The storage control device according to claim 4, wherein the restore control portion is configured to read the copy of the write management information stored in the storage portion upon the backup control portion backing up the one or more data elements, receive new write management information, determine the second set of one or more segments of the plurality of segments that corresponds to the first set of one or more segments based on the copy of the write management information and the new write management information, and restore the one or more data elements stored in the second storage device to the second set of one or more segments.

6. The storage control device according to claim 4, wherein the restore control portion is configured to update the copy of the write management information stored in the storage portion upon the backup control portion backing up the one or more data elements to indicate that none of the plurality of segments is allocated to the virtual volume, read the one or more data elements from the second storage device, select the second set of one or more segments from the plurality of segments to be allocated to the virtual volume for writing the one or more data elements to, restore the one or more data elements to the second set of one or more segments, and update the copy of the write management information to indicate the second set of one or more segments as being allocated to the virtual volume.

7. The storage control device according to claim 1, wherein the write management information includes allocation management information that indicates which segments from the plurality of segments are allocated to the virtual volume, and wherein the virtualization portion, in response to the first write request, selects the one or more allocated segments from one or more segments from the plurality of segments that are not allocated to the virtual volume based on the allocation management information, updates the allocation management information to indicate the one or more allocated segments as being allocated to the virtual volume, generates the second write request, and transmits the second write request to the write execution portion.

8. The storage control device according to claim 1, further comprising:

a storage portion which stores a copy of the write management information upon the backup control portion backing up the one or more data elements stored in the first set of one or more segments in which writing has occurred; and wherein the restore control portion is configured to read the copy of the write management information stored in the storage portion upon the backup control portion backing up the one or more data elements, and restore the one or more data elements stored in the second storage device to the first set of one or more segments according to the write management information stored in the storage portion upon the backup control portion backing up the one or more data elements or to the second set of one or more of segments of the plurality of segments that corresponds to the first set of one or more segments according to new write management information that is generated based on the copy of the write management information.

9. The storage control device according to claim 1, further comprising:

a storage portion which stores a copy of the write management information upon the backup control portion backing up the one or more data elements stored in the first set of one or more segments in which writing has occurred; and wherein the restore control portion is configured to read the copy of the write management information stored in the storage portion upon the backup control portion backing up the one or more data elements, receive new write management information representing the second set of one or more segments of the plurality of segments that correspond to the first set of one or more segments based on the copy of the write management information, and restore the one or more data elements stored in the second storage device to the second set of one or more segments according to the new write management information.

10. The storage control device according to claim 1, wherein each of the one or more first storage devices is a random access-type storage device, and the second storage device is a sequential access-type storage device.

11. A virtualization system, comprising:
a storage control device that comprises:
one or more first storage devices having a plurality of segments, each segment comprising a physical storage area;
a second storage device; and
a backup control portion configured to use write management information for a virtual volume that indicates a first set of one or more segments of the plurality of segments that are allocated to the virtual volume and in which writing has occurred and to back up one or more data elements stored in the first set of one or more segments to the second storage device based on the write management information, the write management information including allocation management information that indicates which segments from the plurality of segments are allocated to the virtual volume;
a restore control portion configured to reset allocation of each segment of the plurality of segments allocated to the virtual volume, allocate a second set of one or more segments of the one or more first storage devices that are not allocated to the virtual volume that correspond to the first set of one or more data segments such that a capacity of the second set of one or more segments is sufficient for storing the one or data elements backed up to the second storage device, and restore the one or data elements from the second storage device to the second set of data segments based on allocations of the second set of one or more segments to the virtual volume; and
a virtualization portion configured to, in response to a first write request that specifies data for writing to the virtual volume, select one or more segments from the plurality of segments that are not allocated to the virtual volume based on the allocation management information, allocate the selected one or more segments of the plurality of segments to the virtual volume, and transmits a second write request specifying the selected one or more segments and the data for writing to the selected one or more segments, the virtual volume presenting a volume capacity that is larger than a capacity of the selected one or more segments.

12. The virtualization system according to claim 11, further comprising a write execution portion that receives the second write request from the virtualization portion, writes data to the one or more first storage devices according to the second write request, and updates the allocation management information in the storage resource to indicate the selected one or more segments as being allocated to the virtual volume.

13. The virtualization system according to claim 11, further comprising an allocation management information storage portion which stores the allocation management information upon the backup control portion backing up the one or more data elements stored in the first set of one or more segments in which writing has occurred to the second storage device, wherein the storage control device further comprises a storage portion, the storage portion stores a copy of the write management information upon the backup control portion backing up the one or more data elements stored in the first set of one or more segments, and the restore control portion is configured to read the copy of the write management information, and restore the one or more data elements stored in the second storage device to the first set of one or more segments in which writing has occurred based on the copy of the write management information, and wherein the allocation management information storage portion restores the allocation management information from a time of the backup control portion backing up the one or more data elements stored in the first set of one or more segments to the storage resource.

14. The virtualization system according to claim 11, further comprising:
a write execution portion that receives the second write request from the virtualization portion and writes data to the one or more first storage devices according to the second write request; and
a write management information transmission portion which transmits the write management information comprising the allocation management information to the virtualization portion and updates the allocation management information to indicate the selected one or more segments as being allocated to the virtual volume.

15. The virtualization system according to claim 14, further comprising a segment reallocation portion, wherein the storage control device further comprises a storage portion, the storage portion stores a copy of the write management information upon the backup control portion backing up the one or more data elements stored in the first set of one or more segments in which writing has occurred, and the restore control portion is configured to read the copy of the write management information stored in the storage portion upon the backup control portion backing up the one or more data elements and transmit the copy of the write management information to the segment reallocation portion, wherein the segment reallocation portion associates the second set of one or more segments of the plurality of segments respectively with the first set of one or more segments allocated to the virtual volume according to the copy of the write management information transmitted from the storage control device, generates new write management information indicating the second set of one or more segments based on the copy of the write management information, and transmits the new write management information to the storage control device, and wherein the restore control portion of the storage control device is configured to restore respectively the one or more data elements stored in the second storage device to the second set of one or more segments indicated by the new write management information transmitted from the segment reallocation portion.

16. A storage control method for a virtualization system, the storage control method comprising:
allocating, in response to a first write request, one or more segments of a plurality of segments of one or more first storage devices to a virtual volume that presents a volume capacity that is larger than a capacity of the one or more allocated segments, each segment of the plurality of segments comprising a physical storage area;
using write management information that indicates a first set of one or more segments of the plurality of segments that are allocated to a virtual volume and in which writing has occurred to back up one or more data elements stored in the first set of one or more segments to a second storage device based on the write management information; and
performing a restore of the one or more data elements backed up to the second storage device by resetting allocation of each segment of the plurality of segments allocated to the virtual volume, allocating a second set of one or more segments of the plurality of segments that are not allocated to the virtual volume that correspond to the first set of one or more data segments such that a capacity of the second set of one or more segments is sufficient for storing the one or data elements backed up to the second storage device, and restoring the one or data elements from the second storage device to the second set of data segments based on allocations of the second set of one or more segments to the virtual volume.

17. The storage control method according to claim 16, further comprising generating a second write request for writing data to the one or more first storage devices, the second write request being based on the first write request that specifies the data for writing to the virtual volume, the second write request specifying the one or more segments of the one or more first storage devices allocated in response to the first write request and the data for writing to the one or more allocated segments.

18. The storage control method according to claim 17, wherein the write management information includes allocation management information that indicates which segments from the plurality of segments are allocated to the virtual volume, and further comprising selecting the one or more segments allocated in response to the first write request from one or more segments from the plurality of segments that are not allocated to the virtual volume based on the allocation management information, and updating the allocation management information to indicate the one or more allocated segments as being allocated to the virtual volume.

19. The storage control method according to claim 16, further comprising:
 storing a copy of the write management information in the second storage device upon backing up the one or more data elements stored in the first set of one or more segments to the second storage device;
 reading the copy of the write management information stored in the second storage device in the second storage device upon backing up the one or more data elements from the second storage device; and
 restoring the one or more data elements stored in the second storage device to the second set of one or more of segments of the plurality of segments that corresponds to the first set of one or more segments according to new write management information that is generated based on the copy of the write management, information.

\* \* \* \* \*